United States Patent
Thirumalai et al.

(10) Patent No.: US 7,970,773 B1
(45) Date of Patent: Jun. 28, 2011

(54) DETERMINING VARIATION SETS AMONG PRODUCT DESCRIPTIONS

(75) Inventors: Srikanth Thirumalai, Clyde Hill, WA (US); Aswath Manoharan, Bellevue, WA (US); Xiaoxin Yin, Urbana, IL (US); Mark J. Tomko, Seattle, WA (US); Grant M. Emery, Seattle, WA (US); Vijai Mohan, Bellevue, WA (US); Egidio Terra, Porto Alegre (BR)

(73) Assignee: Amazon Technologies, Inc., Reno, NV (US)

( * ) Notice: Subject to any disclaimer, the term of this patent is extended or adjusted under 35 U.S.C. 154(b) by 903 days.

(21) Appl. No.: 11/863,020

(22) Filed: Sep. 27, 2007

Related U.S. Application Data

(60) Provisional application No. 60/940,367, filed on May 25, 2007.

(51) Int. Cl.
*G06F 7/00* (2006.01)
(52) U.S. Cl. .................................. 707/749; 707/917
(58) Field of Classification Search ............... 707/1–10, 707/749, 917, 999.001–999.01
See application file for complete search history.

(56) References Cited

U.S. PATENT DOCUMENTS

| | | | |
|---|---|---|---|
| 4,849,898 A | 7/1989 | Adi | |
| 5,062,074 A | 10/1991 | Kleinberger | |
| 5,261,112 A | 11/1993 | Futatsugi | |
| 5,835,892 A | 11/1998 | Kanno | |
| 5,960,383 A | 9/1999 | Fleischer | |
| 6,038,561 A | 3/2000 | Snyder | |
| 6,075,896 A | 6/2000 | Tanaka | |
| 6,076,086 A | 6/2000 | Masuichi | |
| 6,167,398 A | 12/2000 | Wyard | |
| 6,173,251 B1 | 1/2001 | Ito | |
| 6,263,121 B1 | 7/2001 | Melen | |
| 6,606,744 B1 | 8/2003 | Mikurak | |
| 6,810,376 B1 | 10/2004 | Guan | |
| 6,961,721 B2 | 11/2005 | Chaudhuri | |
| 7,113,943 B2 | 9/2006 | Bradford | |
| 7,346,839 B2 | 3/2008 | Acharya | |
| 7,386,441 B2 | 6/2008 | Kempe | |

(Continued)

FOREIGN PATENT DOCUMENTS

EP 1 380 966 A2 1/2004

OTHER PUBLICATIONS

Wikipedia Definition, "Jaccard Index", Aug. 11, 2010, Wikimedia Foundation Inc.*

(Continued)

*Primary Examiner* — Mohammad Ali
*Assistant Examiner* — John P Hocker
(74) *Attorney, Agent, or Firm* — Robert C. Kowert; Meyertons, Hood, Kivlin, Kowert & Goetzel, P.C.

(57) ABSTRACT

Systems and methods for determining a set of variation-phrases from a collection of documents in a document corpus is presented. Potential variation-phrase pairs among the various documents in the document corpus are identified. The identified potential variation-phrase pairs are then added to a variation-phrase set. The potential variation-phrase pairs in the variation-phrase set are filtered to remove those potential variation-phrase pairs that do not satisfy a predetermined criteria. After filtering the variation-phrase set, the resulting variation-phrase set is stored in a data store.

25 Claims, 17 Drawing Sheets

U.S. PATENT DOCUMENTS

| | | |
|---|---|---|
| 7,426,507 B1 | 9/2008 | Patterson |
| 7,529,756 B1 | 5/2009 | Haschart |
| 7,562,088 B2 | 7/2009 | Daga |
| 7,567,959 B2 | 7/2009 | Patterson |
| 7,599,914 B2 | 10/2009 | Patterson |
| 7,603,345 B2 | 10/2009 | Patterson |
| 2002/0016787 A1 | 2/2002 | Kanno |
| 2003/0065658 A1 | 4/2003 | Matsubayashi |
| 2003/0101177 A1 | 5/2003 | Matsubayashi |
| 2004/0059736 A1* | 3/2004 | Willse et al. ............... 707/100 |
| 2005/0187916 A1* | 8/2005 | Levin et al. ............... 707/3 |
| 2006/0112128 A1 | 5/2006 | Brants |
| 2006/0282415 A1 | 12/2006 | Shibata |
| 2007/0076936 A1* | 4/2007 | Li et al. ............... 382/129 |
| 2010/0049709 A1* | 2/2010 | Ravikumar et al. ............... 707/6 |
| 2010/0169327 A1* | 7/2010 | Lindsay et al. ............... 707/750 |

OTHER PUBLICATIONS

Wikipedia Definition, "Needleman Wunsch" Jun. 10, 2010, Wikimedia Foundation Inc., pp. 1-5.*

Wikipedia Definition, "Sequence Alignment", Aug. 5, 2010, Wlkimedia Foundation Inc., p. 1.*

Ghahramani, Z., and K.A. Heller, "Bayesian Sets," Advances in Neural Information Processing Systems 18 (2006).

"Google Sets," © 2007 Google, <http://labs.google.com/sets>, [retrieved Feb. 13, 2008].

Bilenko, M., et al., "Adaptive Name Matching in Information Integration," IEEE Intelligent Systems 18(5):16-23, Sep./Oct. 2003.

Kilgarriff, A., "Using Word Frequency Lists to Measure Corpus Homogeneity and Similarity between Corpora," Information Technology Research Institute Technical Report Series, ITRI-97-07, University of Brighton, U.K., Aug. 1997, 16 pages.

Ramos, J., "Using TF-IDF to Determine Word Relevance in Document Queries," Proceedings of the First Instructional Conference on Machine Learning (iCML-2003), Piscataway, N.J., Dec. 3-8, 2003, 4 pages.

* cited by examiner

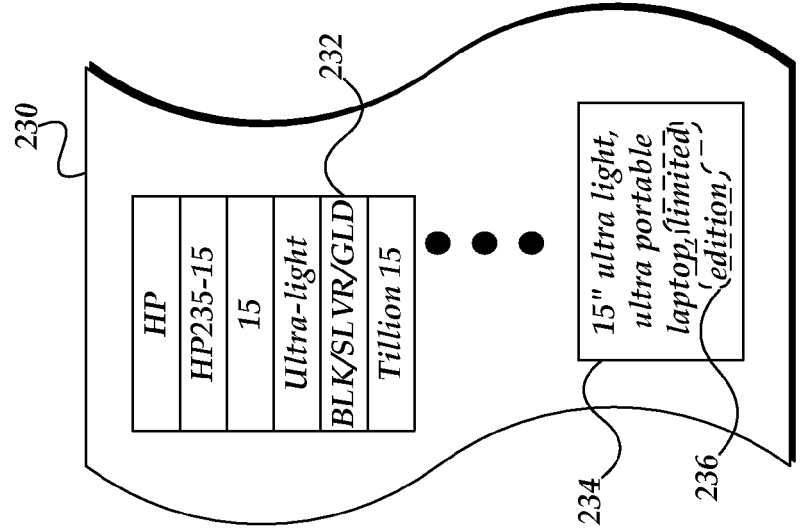
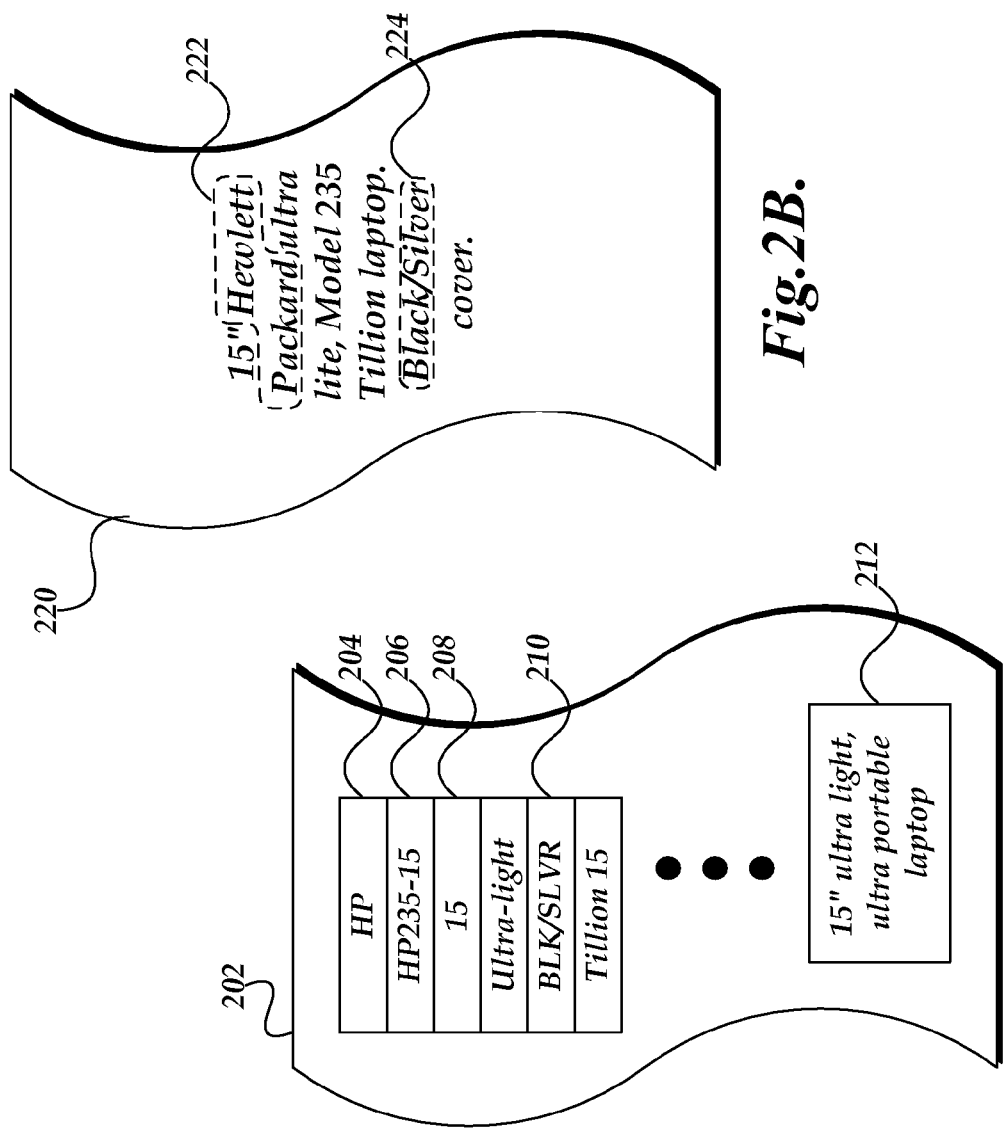

Fig.11A.

MATCH: +1
GAP: 0
MISMATCH: -1

TRADITIONAL
NEEDLEMAN-WUNSCH
ALGORITHM

Folkmani's Mini [Frog] ---- [Finger Puppet]
Folkmani's Mini ---- [Cat] [Finger Puppet]
                    1102  1104

Fig.11B.

MATCH: +1
GAP: -1
MISMATCH: 0

MODIFIED
NEEDLEMAN-WUNSCH
ALGORITHM

Folkmani's Mini [Frog] Finger Puppet
Folkmani's Mini [Cat] Finger Puppet
                            1106

Fig.11C.

MATCH: +1
GAP: 0
MISMATCH: -1

TRADITIONAL
NEEDLEMAN-WUNSCH
ALGORITHM

NBA [PHOENIX SUNS] ---- [TEAM JERSEY]
NBA ---- [UTAH JAZZ] [TEAM JERSEY]
     1108           1110

Fig.11D.

MATCH: +1
GAP: -1
MISMATCH: 0

MODIFIED
NEEDLEMAN-WUNSCH
ALGORITHM

NBA [PHOENIX SUNS] TEAM JERSEY
NBA [UTAH JAZZ] TEAM JERSEY
                    1112

US 7,970,773 B1

DETERMINING VARIATION SETS AMONG PRODUCT DESCRIPTIONS

CROSS-REFERENCES TO RELATED APPLICATIONS

This application claims the benefit of U.S. Provisional Application No. 60/940,367, filed May 25, 2007, which is incorporated herein by reference. This application is also related to commonly assigned and co-pending U.S. patent application Ser. No. 11/754,237, filed May 25, 2007.

BACKGROUND

One aspect associated with the widespread usage of networks generally, and the Internet particularly, has been the emergence of electronic marketplaces. An electronic marketplace is typically a network site that offers a consistent, seemingly united, electronic storefront to networked consumers. Typically, the electronic marketplace is hosted on the Internet as one or more Web pages, and viewed by a consumer via a networked computer. FIG. 1 is a pictorial diagram of an illustrative networked environment 100 that includes an electronic marketplace. In particular, the networked environment 100 includes a host server 102 that hosts the electronic marketplace 104. As indicated above, a typical electronic marketplace is comprised of one or more Web pages that are viewable on a consumer's computer via a Web browser. However, for illustration purposes, the electronic marketplace 104 is shown in FIG. 1 as residing "outside" of a client computer. Consumer computers, such as consumer computers 106-108, connect to the host server to access the electronic marketplace via a network 110, such as, but not limited to, the Internet. The electronic marketplace 104 allows consumers, via their client computers 106-108, to view and purchase items offered for sale or lease on the electronic marketplace.

In many instances, an electronic marketplace 104 includes items from many different vendors or suppliers. For example, as shown in FIG. 1, the electronic marketplace 104 offers items from vendors 112 and 114. Still further, these electronic marketplaces allow individuals to offer both new and used items to consumers via the electronic marketplace. To do so, the vendors/suppliers 112-114, as well as consumers, such as a consumer operating consumer device 108, provide descriptions of products to be offered on the electronic marketplace 104 to the host server 102. The illustrated descriptions include descriptions 120-124.

Naturally, if an item is offered through the electronic marketplace 104, all instances of that item from all vendors should be displayed to the consumer as various options of the same item rather than individual items that are viewed separately. Unfortunately, since individual vendors and consumer/sellers provide the host server 102 with their own descriptions of the products that they wish to sell, it becomes an onerous, manual task to determine which product descriptions reference the same items and which reference different items. For example, FIGS. 2A-2C present illustrative product description documents submitted from two separate vendors. As suggested by the illustration, document 202 of FIG. 2A includes a structured or fielded document with information organized in a structure, such as manufacturer 204, model number 206, screen size 208, case color 210, and a brief description 212. Document 220 of FIG. 2B is not structured or fielded, but rather a free-form paragraph description (typical of product descriptions provided by consumers) that includes important information. With regard to documents 202 and 220, and upon inspection of the two documents, a person familiar with the subject matter of laptops (or even one not quite so familiar) is likely to recognize that these two documents likely describe the same product. In other words, a person would recognize that the manufacturer ("HP") identified in the manufacturer field 204 and the name "Hewlett Packard" in text area 222 are a reference to the same manufacturer. Similarly, a person would likely recognize that the case color "BLK/SLVR" in the case color field 210 is the abbreviation for "Black/Silver" as recited in full in text area 224. From comparisons of other terms/fields, while not necessarily resulting in a letter-perfect match, a person would recognize the two documents as being substantially similar, i.e., describing the same or substantially the same product or subject matter. Moreover, if these descriptions were properly identified as duplicates (i.e., that the subject matter described by both documents is the same), a host server 102 would group them together as descriptions of a single product item.

Document 230 of FIG. 2C is a structured document and includes fields that are very similar to that of document 202. However, in contrast to document 202 (and to document 220), there are certain differences between the two that a person would likely recognize and conclude that they describe different products. For example, the case color field 232 recites "BLK/SLVR/GLD," adding an additional color to the case. Additionally, the product description 234 includes additional language, "limited edition," in text area 336 that would indicate that this laptop, in contrast to the one described in document 202, is somewhat different (i.e., a limited edition version) and not a duplicate.

Unfortunately, while a person can be trained to discern the differences between duplicate product descriptions, it is difficult for a computer to programmatically analyze two documents to determine whether or not they are duplicates (i.e., whether or not they describe the same product). Clearly, this problem is exacerbated when the number of products offered by an electronic marketplace 104 (originating from a myriad of vendors) is measured in hundreds of thousands or more.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A computer system for determining a set of variation-phrases from a collection of documents is presented. The computer system comprises at least a processor and a memory. Moreover, the computer system is communicatively coupled to a document corpus. The document corpus comprises a plurality of documents from which the set of variation-phrases are to be determined. The computer system is configured to perform as follows. Variation-phrase pairs among the various documents in the document corpus are first identified. The identified potential variation-phrase pairs are then added to a variation-phrase set. The potential variation-phrase pairs in the variation-phrase set are filtered to remove those potential variation-phrase pairs that do not satisfy a predetermined criteria. After filtering the variation-phrase set, the resulting variation-phrase set is stored in a data store.

An alternative embodiment of a computer system for determining a set of variation-phrases from a collection of documents is presented. comprises at least a processor and a memory. Moreover, the computer system is communicatively coupled to a document corpus. The document corpus comprises a plurality of documents from which the set of variation-phrases are to be determined. The computer system is configured to perform as follows, for each document in the document corpus. A set of similar documents from the document corpus having at least some tokens in common is identified. The text of the documents of the identified set of similar documents is aligned to identify potential variation-phrase pairs. The potential variation-phrase pairs are then added to a variation-phrase set. Weakly linked potential variation-phrase pairs are pruned from the variation-phrase set and the resulting variation-phrase set is stored in a data store.

According to alternative aspects of the disclosed subject matter, an electronic market place offering items for sale from a plurality of vendors to consumers over a communication network is presented. The electronic market place comprises a host server and a document corpus. The host server is communicatively coupled to the computer network for presenting an electronic market place to and interacting with consumers over the communication network. The document corpus is accessible to the host server and comprises a plurality of product descriptions from at least some of the plurality of vendors. The product descriptions describe the items for sale via the electronic market place. Further, the host server is configured to operate as follows. Potential variation-phrase pairs are identified among the various product descriptions in the document corpus. These the potential variation-phrase pairs are added to a variation-phrase set. The potential variation-phrase pairs are filtered to remove those potential variation-phrase pairs that do not satisfy a predetermined criteria, and the resulting variation-phrase set is stored in a data store.

According to yet further alternative aspects of the disclosed subject matter, a computer-implemented method and/or a computer-readable medium bearing computer-executable instruction of a method for generating a set of variation-phrases from a plurality of documents in a document corpus are presented. The method comprises the following steps. With regard to each document in the document corpus, the following are executed. A set of similar documents from the document corpus having at least some tokens in common is identified. The text of the documents of the identified set of similar documents is aligned to identify potential variation-phrase pairs and the potential variation-phrase pairs are added to a variation-phrase set. After processing the documents of the document corpus, weakly linked potential variation-phrase pairs are pruned from the variation-phrase set, and the resulting variation-phrase set is stored in a data store.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 2A-2C are representative document descriptions regarding products from vendors, suitable for illustrating documents describing similar and dissimilar products;

FIGS. 11A-11D illustrate product descriptions aligned according to the Needleman-Wunsch text alignment algorithm and a modified Needleman-Wunsch text alignment algorithm;

DETAILED DESCRIPTION

By way of definition, a document corpus refers to a collection of documents. As used in this description, a document is a body of text generally directed to describing a particular subject matter. A typical, exemplary document might be a product description of a digital camera, where the product description includes the camera's manufacturer, a product number, various technical features, cosmetic features, and the like. A document corpus may be stored in one or more data stores or catalogues. In the following discussion, the referred-to document corpus is a collection of product descriptions of products offered for sale by various providers. The product descriptions are generally provided to a host server 102 conducting an electronic marketplace 104 for consumers.

By way of further definition, while the following discussion will frequently be made in regard to determining whether a first document is substantially similar to another document in a document corpus and therefore considered a duplicate, this is a shorthand reference to determining whether the subject matter described by a first document is the same or substantially the same subject matter described by another document in the document corpus. As suggested above, for purposes of simplicity and clarity in describing the disclosed subject matter, when the subject matter described by one document is the same or substantially similar to the subject matter described by another document or documents, these documents are said to be "duplicates."

Generally speaking, there are two aspects for determining whether or not a given document is substantially similar to another document in the document corpus (i.e., the subject matter described by a first document is the same as the subject matter described by another document): identification (also referred to as recall) and precision. Identification/recall refers to identifying documents in the document corpus that are candidate duplicate documents. Precision refers to the accuracy of identifying only true duplicates of a given document. Quite frequently, in order to ensure that actual or true duplicates for a first document are found among the documents in a document corpus, it is often desirable to be "aggressive" in selecting candidate duplicate documents such that there are several candidates that are not duplicates, i.e., false positives. Stated differently, identification should select a duplicate (provided a duplicate exists in the document corpus) nearly 100% of the time, at the expense of including candidate documents that are not true duplicates. According to aspects of the disclosed subject matter, to improve the precision (i.e., the accuracy of identifying only true duplicates), after aggressively identifying candidate documents, filters may be applied to "weed out" the non-duplicate candidate documents.

Figure 1:
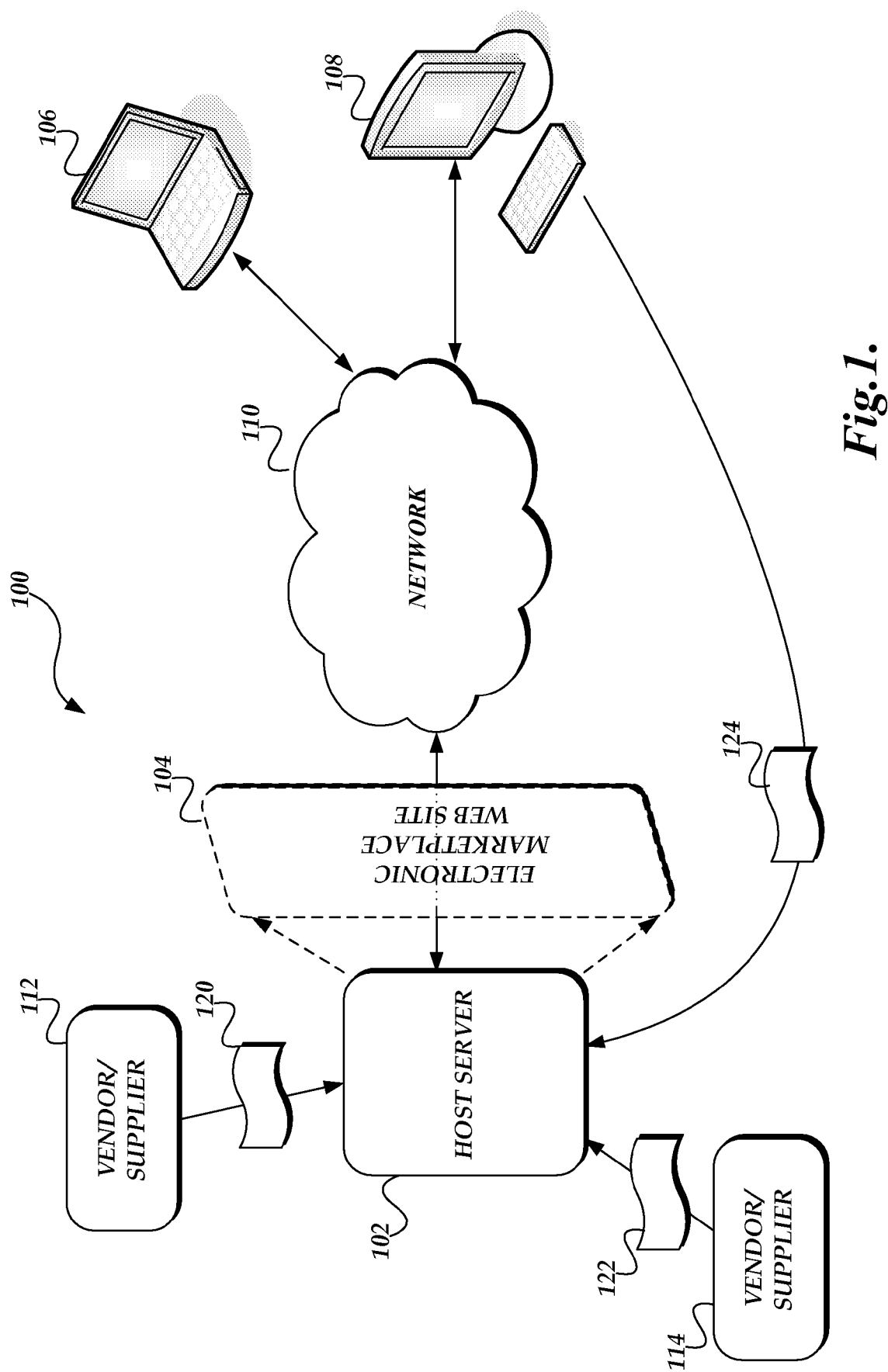
FIG. 1 is a pictorial diagram of an illustrative networked environment providing an electronic marketplace.
Figure 3:
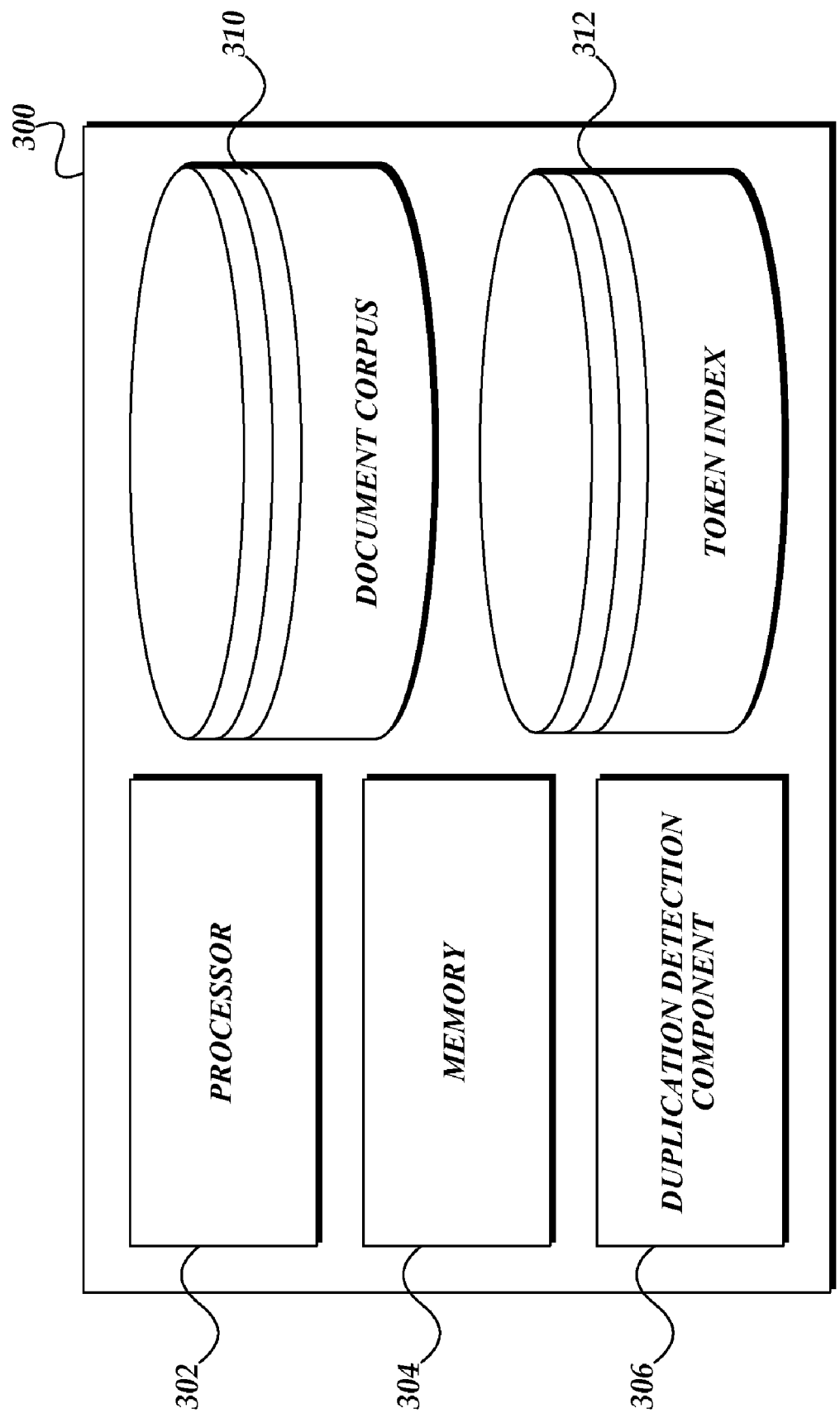
FIG. 3 is a block diagram illustrating logical components of a computer system suitable for determining whether a submitted document is substantially similar to another document and therefore considered a duplicate, in accordance with one or more embodiments of the disclosed subject matter.

FIG. 3 is a block diagram illustrating logical components of a computer system 300 suitable for detecting whether a first document is a duplicate of one or more other documents in a document corpus. Prior to discussing these components, it should be appreciated that the components described herein are logical components, not necessarily actual components. In an actual embodiment, any one of the logical components may be embodied in one or more discrete actual components, and/or combined with several components.

The computer system 300 includes a processor 302 for executing instructions to determine whether a first document is substantially similar to another document in a document corpus. The processor executes instructions from a memory 304 that may be comprised of random access memory (RAM), read-only memory (ROM), disk storage, remote online storage, and the like. The computer system is illustrated as also including a duplicate detection component 306 which is used by the computer system 300 to detect whether a first document is substantially similar to another document in a document corpus. Of course, in an actual embodiment, the duplicate detection component 306 may be implemented as a hardware component, a software component (stored in the memory 304), a combination of hardware and software, a service provided by another computing device, and the like.

The computer system 300 is also illustrated as including a document corpus 310. As indicated above, the document corpus is a collection of documents, such as documents describing a product or service for sale. This document corpus may be organized in a database, such as illustrated in FIG. 3, but it is not necessary to be in a database. It may be, however, important to be able to access the documents in the document corpus when identifying and filtering for duplicates, as will be described in more detail below. While the document corpus 310 is illustrated as being a part of the computer system 300, in an actual embodiment, the document corpus 310 may be stored external, yet accessible, to the computer system 300.

The computer system 300 is also illustrated as including a token index 312. As will be described below, the token index corresponds to an index of tokens (including alphabetic strings, numbers, and alpha-numeric strings) from the various documents in the document corpus 310. As is common with indices, the token index 312 will typically include information such as, but not limited to, the frequency of a token in each document, references to the documents for each token, the document field in which the token is found, and the like. As with the document corpus 310, while illustrated as a logical component of the computer system 300, in an actual embodiment the token index 312 may be incorporated in the computer system which is otherwise accessible to the computer system for use in determining whether a document is substantially similar to one or more documents in a document corpus 310, and therefore considered to be a duplicate document. Further still, the index, while suggestively illustrated as being stored in a database, may be formed and maintained in an manner according to the needs of the implementing system.

Figure 4:
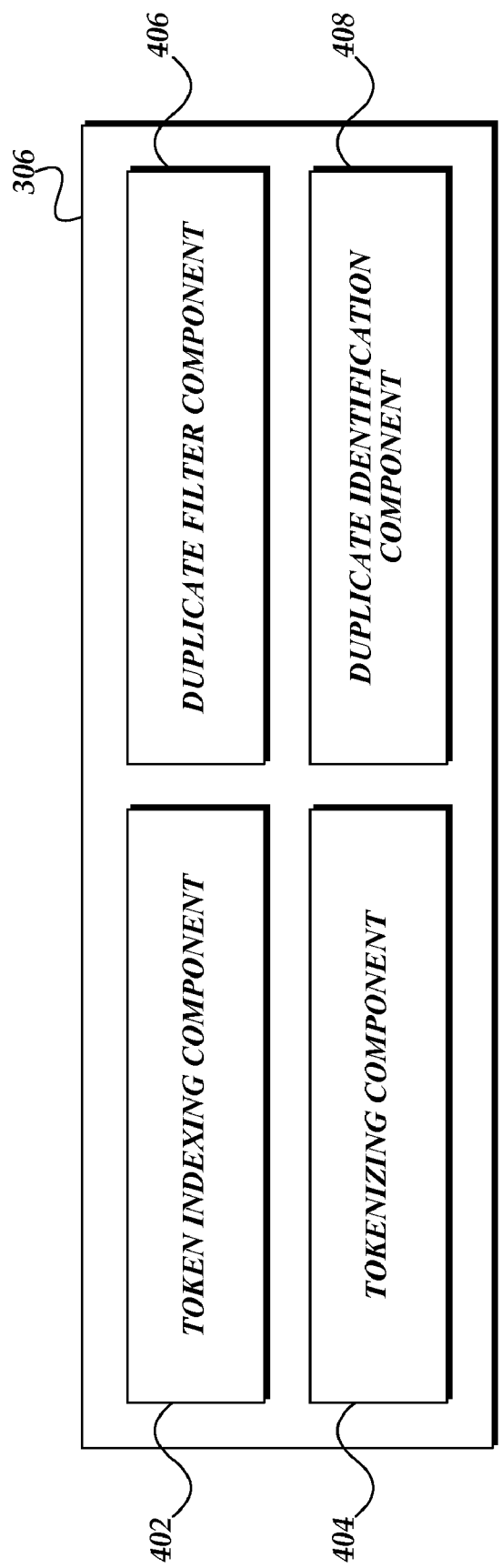
FIG. 4 is a block diagram illustrating logical components of a duplicate detection component, as introduced in regard to the host server of FIG. 3, for detecting duplicate document descriptions submitted to the host server, in accordance with one or more embodiments of the disclosed subject matter.

Turning again to the duplicate detection component 306, it should be appreciated that this component may be broken down into its own logical components. To that end, FIG. 4 is a block diagram illustrating logical components of a duplicate detection component 306 formed according to the disclosed subject matter. As shown in FIG. 4, the duplicate detection component 306 includes a token indexing component 402, a tokenizing component 404, a duplicate filter component 406, and a duplicate identification component 408. Of course, it should be appreciated that while a duplicate detection component 306 would include these logical components, in an actual embodiment, there may be additional components not described herein. Further still, each of the above-described components may be combined in one or more of the logical components. Accordingly, the logical divisions shown in FIG. 4 should be viewed as illustrative only, and not viewed as limiting upon the disclosed subject matter.

The token indexing component 402 is used to generate the token index 312 described above, using tokens generated by the tokenizing component 404. The tokenizing component 404 parses a document to identify discrete alphabetic, alpha-numeric, and numeric strings, and converts the identified strings into a set of tokens. The duplicate filter component 406 filters candidate duplicate documents identified by the duplicate identification component 408 to eliminate those candidates that are not true duplicates of (i.e., are not substantially similar to) a first document. Finally, as suggested, the duplicate identification component 408 identifies potential duplicates, referred to as candidate duplicate documents or, more simply, candidate documents, of a given document in the document corpus 310.

To better illustrate the operation of the various components described in both FIGS. 3 and 4, reference is made to various flow diagrams. As suggested above, the duplicate detection component 306 determines whether a given document, such as a product description offered by a vendor/consumer, is a duplicate of another document in a document corpus 310. This determination is made, at least in part, by use of the token index 312. Accordingly, FIG. 5 is a flow diagram of an illustrative routine 500 for generating a token index 312 from the documents of a document corpus 310, in accordance with one or more embodiments of the disclosed subject matter.

Figure 5:
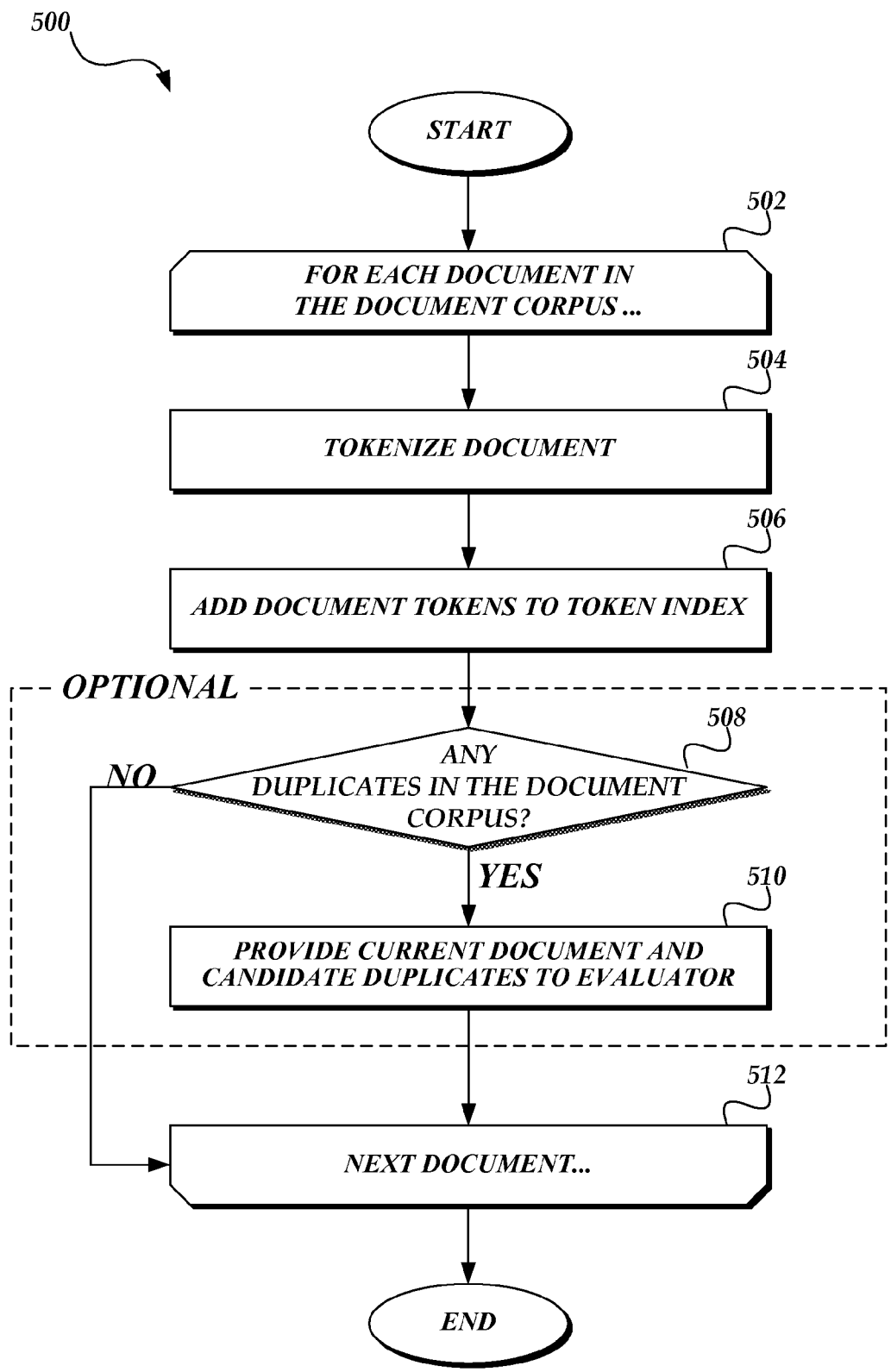
FIG. 5 is a flow diagram of an illustrative routine for preparing an index of a document corpus for use in duplicate detection according to aspects and embodiments of the disclosed subject matter.

As shown in FIG. 5, control block 502 is the beginning of an iterative process that loops through each of the documents (i.e., "for each document") in the document corpus 310 in order to generate the token index 312. This iterative process includes all of the steps 504-510 between the start of the loop 502 and end control block 512. Thus, for a given document in the document corpus 310, at block 504, the document is tokenized. As indicated already, tokenizing a document comprises generating a set of tokens, each corresponding to a string of characters in the document, including alphabetic strings, alpha-numeric strings, and numeric strings. Only one token is generated for a unique set or string of characters such that if the same string occurs more than once in the document, only one token for that string will be generated (though the number of occurrences of that string in the document may be noted). After generating a set of tokens for the document, at block 506, the set of tokens for the document are added to the token index 312.

At this point, if the assumption can be made that there are no duplicates already in the document corpus 310, the process can skip the next two steps which are directed to detecting duplicates in those documents already indexed. Hence, the steps at decision block 508 and block 510 are identified as being optional. Alternatively, however, assuming that it would be good to verify that there are not already duplicates in the document corpus, the routine 500 proceeds to decision block 508 where a determination is made as to whether there are any duplicates of the current document in the document corpus. Determining whether there are one or more duplicates of the document in the document corpus 310 is described in greater detail below in regard to FIGS. 7A and 7B. If there are one or more duplicates of the current document in the document corpus 310, at block 510 the set of candidate documents and the current document may be provided to an evaluator for final determination as to whether they are, in fact, duplicates.

Moreover, should the evaluator determine that at least some of the documents are duplicates, the evaluator may associate the documents in the document corpus 310 as referencing or describing the same product. Thereafter, or if there are no candidate documents for the current document, the process 500 moves to end control block 512 that causes a return to control block 502 where the process iterates to the next document in the document corpus 310. This repetition continues until the process 500 has iterated through all of the documents in the document corpus 310, and then terminates.

Figure 6:
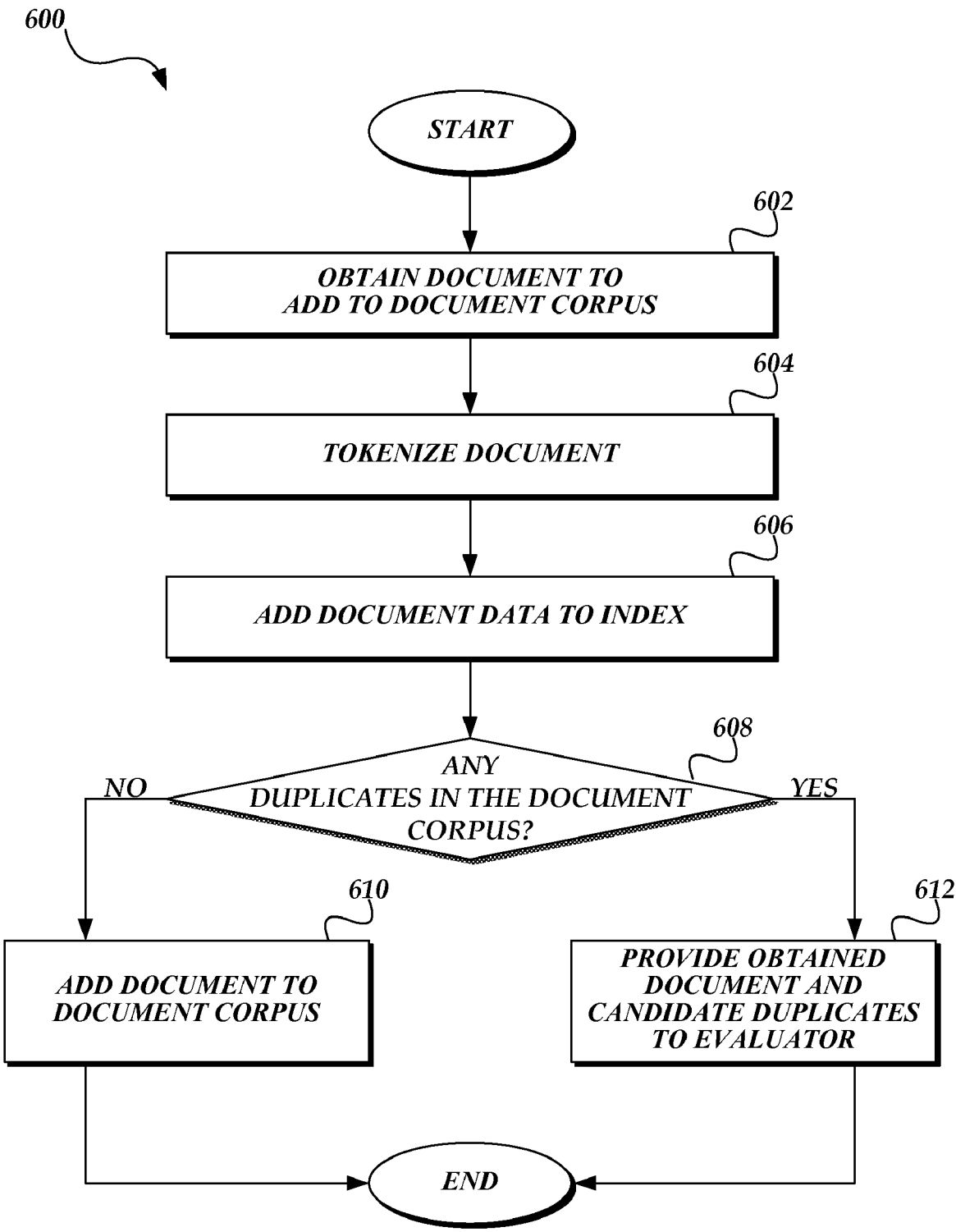
FIG. 6 is a flow diagram of an illustrative routine for determining whether a submitted document is substantially similar to one or more other documents in a document corpus and, therefore, considered a duplicate, in accordance with one or more embodiments of the disclosed subject matter.

In contrast to indexing the documents in the document corpus 310 as described in regard to FIG. 5, FIG. 6 is a flow diagram of an illustrative routine 600 for detecting and identifying candidate documents when receiving and adding a new document to the document corpus 310, in accordance with one or more embodiments of the disclosed subject matter. Beginning at block 602, a document for addition to the document corpus 310 is obtained. At block 604, the obtained document is tokenized, yielding a set of tokens for the obtained document as discussed above. At block 606, the obtained document is added to the token index 312.

Figure 7A:
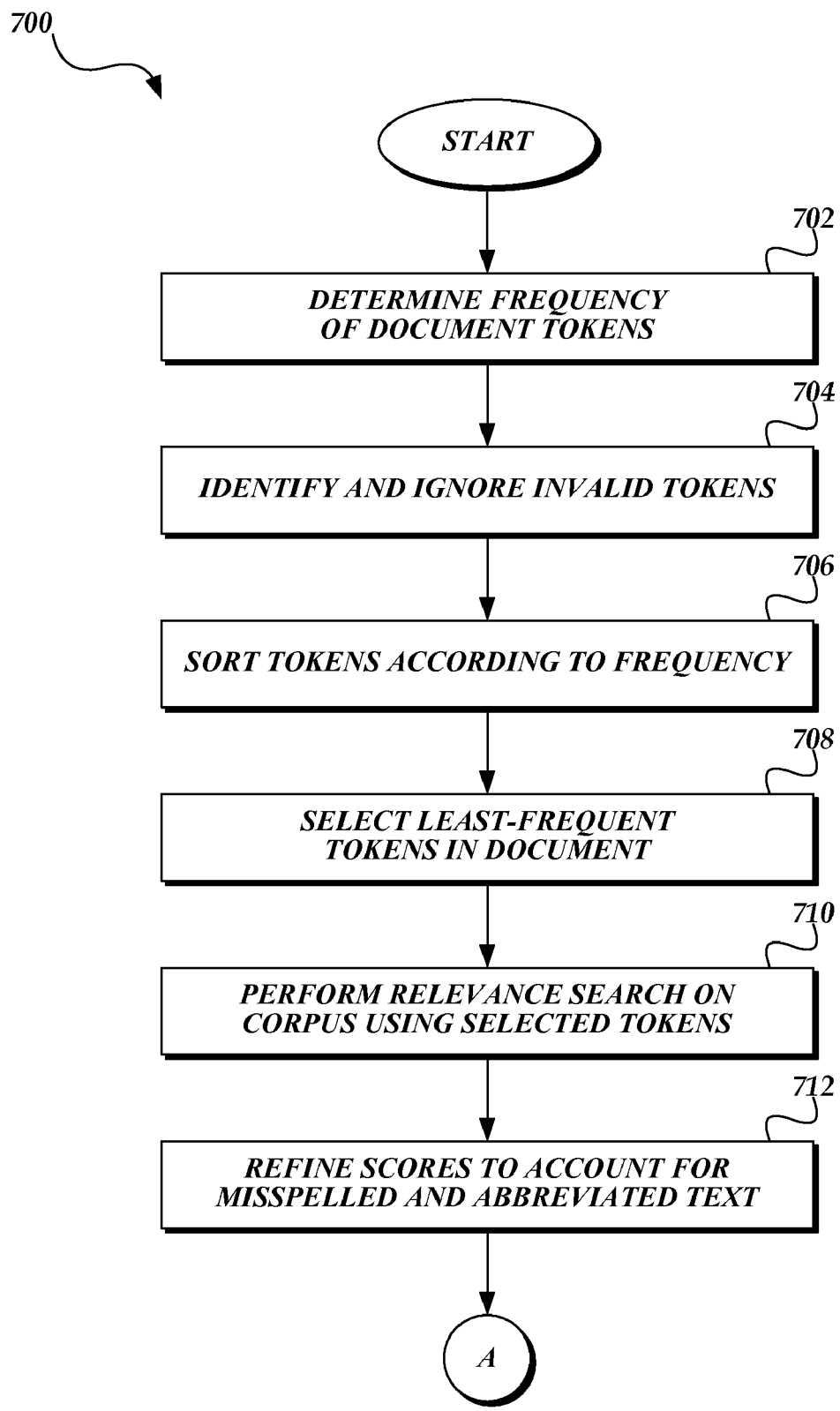
FIGS. 7A-7B are a flow diagram of an illustrative routine for identifying candidate duplicate documents for a submitted document and filtering out false duplicates from the candidate documents, in accordance with one or more embodiments of the disclosed subject matter.

At decision block 608, a determination is made as to whether or not the obtained document is substantially similar to, and therefore considered a duplicate of, one or more other documents in the document corpus 310, as described below in regard to FIGS. 7A and 7B. If it is determined that the obtained document is not substantially similar to (and therefore not a duplicate of) other documents in the document corpus 310, at block 610 the document is simply added as a new item to the document corpus. Alternatively, if it is determined that the document may be a duplicate of one or more other documents already in the document corpus 310, at block 612 the obtained document and the set of candidate documents identified as potential duplicates are provided to an evaluator. As above, should the evaluator determine that at least some of the candidate duplicate documents are, in fact, substantially similar and therefore considered duplicates of the obtained document, the evaluator may associate those duplicates in the document corpus 310. After providing the obtained document to the evaluator, the routine 600 terminates.

As mentioned above, FIGS. 7A and 7B are of a flow diagram of an illustrative routine 700 for determining a set of candidate documents (if any) for a current document from the documents in the document corpus 310, in accordance with one or more embodiments of the disclosed subject matter. Beginning at block 702, from the token information generated for the current document, the frequency of the tokens in the current document (i.e., the number of occurrences of the string represented by each token in the current document) is determined. At block 704, invalid tokens (such as misspellings, inadvertent entries, and the like) are identified and eliminated from evaluation. Eliminating invalid tokens ensures a greater likelihood of properly identifying candidate duplicate documents. What remains are valid tokens with their associated occurrence frequency.

At block 706, the tokens are sorted according to their frequency in the current document. At block 708, one or more of the least frequent tokens from the current document are selected. The actual number of tokens selected may be based on a threshold percentage of the total number of tokens in the document, on an absolute threshold number, or according to a particular threshold frequency. Other heuristics for selecting the tokens may further be used, all of which are contemplated as falling within the scope of the disclosed subject matter. Further still, the various thresholds and/or heuristics for selecting the least frequently occurring tokens from the current document may be user configurable.

At block 710, using the selected tokens, a relevance search is performed on the token index 312. As those skilled in the art will appreciate, a relevance search, as used in this context, matches the selected tokens of the current document to other documents in the document corpus having all or some of the same tokens. Moreover, a relevance search generates a score between the current document and another document (based on the amount of search tokens that are found in common with each of the other documents). Still further, a relevance search generates scores based on exact matches between tokens. As indicated above, some documents may include structural or field information. While comparing tokens of similar fields may provide useful information, it should be appreciated that the relevance search of block 710 is an un-fielded search, i.e., the relevance search is made irrespective of any field relation information.

After the relevance search, recognizing the relevance score is based on exact matches and that many of the tokens may be matches but for being slightly misspelled or abbreviated, at block 712 the scores returned from the relevance search are refined to account for such common entry differences, resulting in improved scores (i.e., the likelihood that a candidate document is a duplicate) that more accurately reflect the relevance between the candidate duplicate documents and the current document.

Figure 7B:
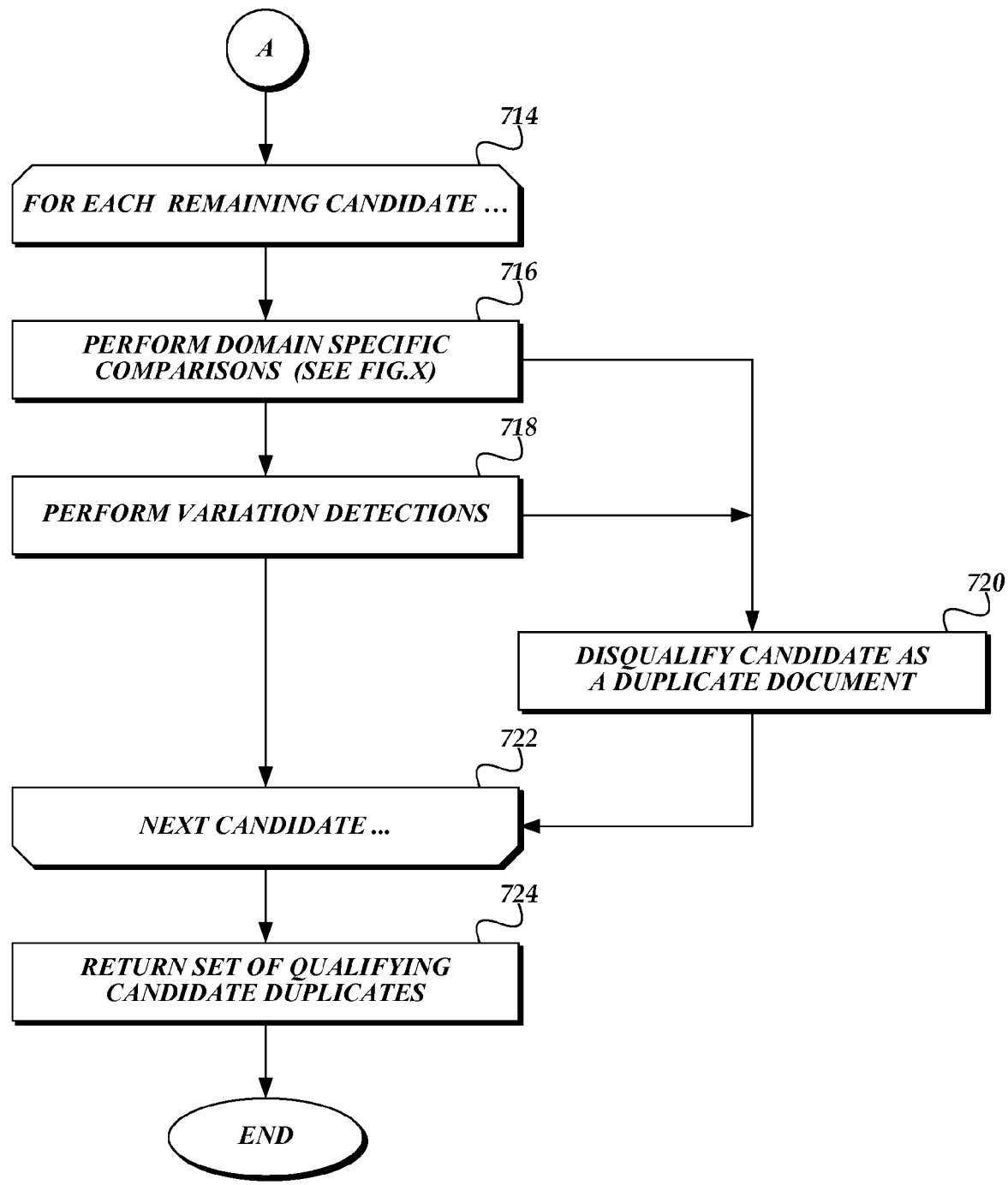

Turning now to FIG. 7B, at control block 714 a looping construct is begun that iterates through the results/candidate documents identified by the previous steps. More particularly, the looping construct iterates through those candidate documents whose score exceeds a predetermined threshold value. Thus, for each identified candidate document with a score above a threshold value, steps 716-720 may be executed. Blocks 716 and 718 identify various filters that may be applied to each candidate document to determine, to a greater degree, whether a candidate document may be a true duplicate of the current document (such that it describes the same or substantially the same subject matter). At end control block 724, the next candidate document with a score above a given threshold is selected and the loop is repeated. When there are no additional candidate documents with a resulting score above the predetermined threshold, the routine 700 proceeds to block 724.

With regard to the filtering steps 716 and 718, in contrast to the relevance search of block 710, at block 716 domain specific (or fielded) comparisons are made between information in the current document and the selected candidate document. Domain specific comparisons are directed to types (or domains/fields) of information in each document when present and identifiable in the documents. These domains include merchant source (i.e., whether the source of the current document is the same as the source for the selected candidate document); package quantities; UPC or product identification values; manufacturer, and the like. As an additional domain specific comparison, a comparison as to the source of both documents (the current document and the candidate document) is made. If the source of the current document and the candidate document is the same, i.e., submitted by the same merchant, an assumption that a merchant would not provide duplicate documents implies that the products described by the two documents are different. Alternatively, if the package quantities, the UPC values, or the manufacturers differ, then the current document and the selected candidate document are not duplicates (i.e., describe different products). If the domain comparisons of block 716 show that the documents are not duplicates, the process 700 proceeds to block 720 where the candidate document is disqualified as a duplicate of the current document.

If the candidate duplicate document is not disqualified as a duplicate document based on domain comparisons, at block 718 variation detections are performed on the candidate document and the current document to determine whether the two documents include mutually exclusive variations such that, while similar, the described subject matter cannot be said to be true duplicates. Examples of such mutually exclusive variations may include the case color (e.g., pink, black, blue, or red) of an otherwise similar portable media player. Accordingly, if the current document and candidate duplicate documents are determined to be such variations, they are not considered duplicates and the routine 700 proceeds to block 720 where the candidate document is disqualified as a duplicate of the current document. If the candidate document has not been disqualified, or after disqualifying the candidate document as a duplicate, the routine 700 proceeds to end control block 722.

At block 724, after processing each candidate document having a score above a given threshold, the set of candidate documents that have not been disqualified as duplicates are returned as the results of the routine 700, and the routine terminates.

It should be appreciated, that while the above described routine 700 (as well as all other routines) illustrate a particular order, those skilled in the art will recognize that various modifications may be made to the order without departing from the scope and intent of the disclosed subject matter.

Figure 8:
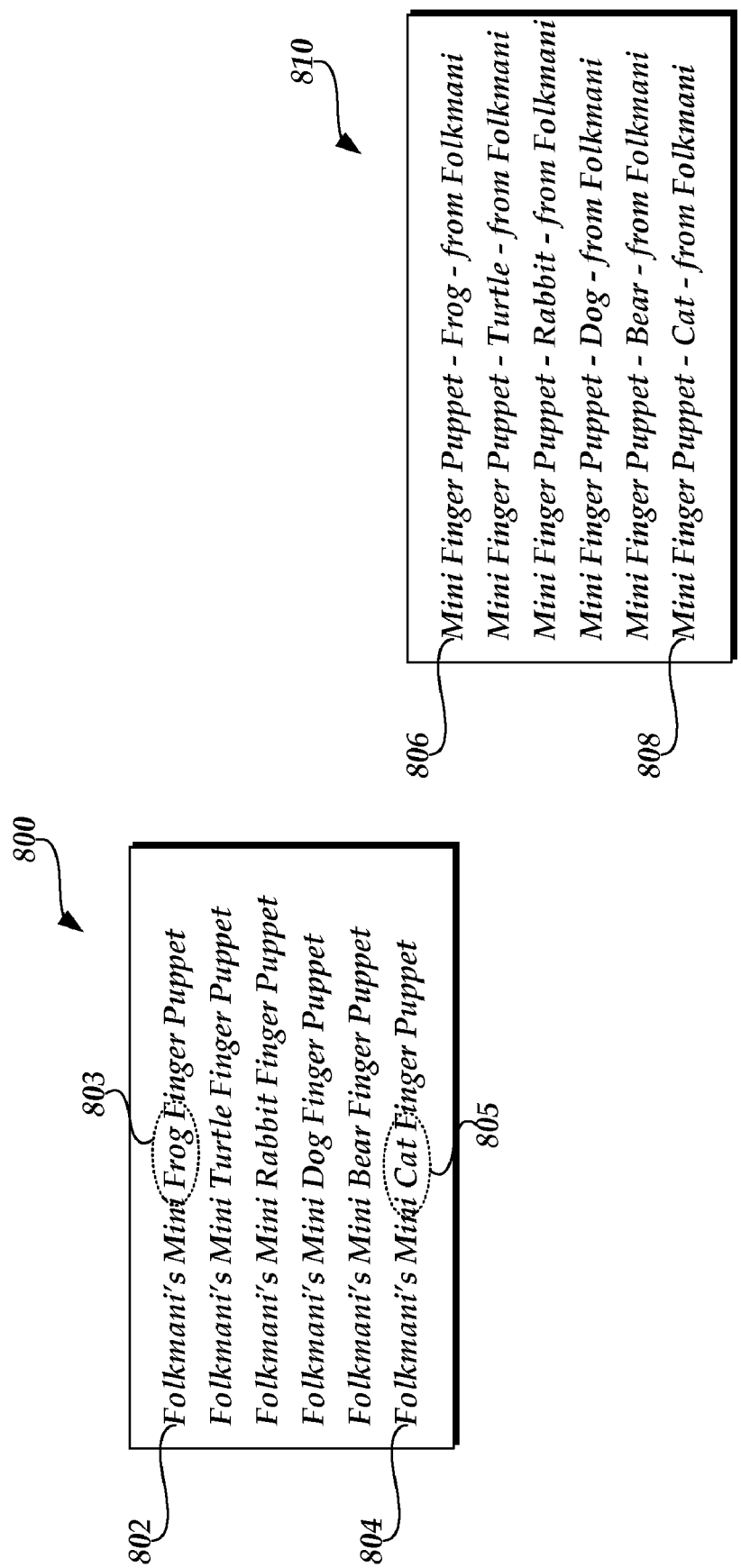
FIG. 8 illustrates two sets of product descriptions suitable for illustrating aspects of determining variation-phrase sets.

While most people can easily identify variations, particularly mutually exclusive variations among similar product descriptions, in fact identifying product variations between descriptions is a daunting task in regard to programmatic identification. For example, FIG. 8 illustrates two sets of product descriptions 800 and 810, each set of product descriptions corresponding to a set of items for sale. Moreover, each set of product descriptions directed to the same set of items for sale but available from different vendors. As shown in set 800, six different finger puppets are described, including description 802 directed to a frog finger puppet and description 804 directed to a cat finger puppet. While most people would recognize that the variations such as frog 803, cat 805, as well as other animals (turtle, rabbit, dog, and bear) clearly differentiate the described items such that the descriptions would not be viewed as describing the same item, in at least some embodiments described above, they would be strongly considered as duplicates. Accordingly, as set forth above in regard to set 718 above, mutually exclusive variations should be identified.

In detecting variations on a general product theme, such as variations in animal types, a vendor supplier will typically provide a product description that conforms to a particular "format", i.e., the words or terms are ordered in a common manner. For example, with regard to set 802, the variation-phrases (e.g., frog 803 and cat 805) are similarly positioned within the product description. This common formatting lends itself to identifying variations among product descriptions. On the other hand, it should be appreciated that the common format is only common to the particular vender, and likely only regarding a particular set of similar items. For example, set 810 includes product descriptions for the same set of items, but as they are from a different vendor than the descriptions illustrated in set 802, the descriptions in set 810 have their own "common" format. For this reason and in regard to product descriptions from various vendors, in identifying variation-phrases, variation-phrases are derived based on vendor-specific submissions.

By way of definition, a variation-phrase is a term/phrase that identifies a variation aspect of a product (or some item), such that a first product (finger puppet) having a first variation-phrase (such as variation-phrase 803) is differentiated from a second product having a second variation-phrase (such as variation-phrase 805). A variation-phrase pair refers to two variation-phrases, and a variation-phrase set refers to a set of variation-phrases that are mutually exclusive to each other.

For simplicity in description, the variation-phrases discussed in the various examples and flow diagrams will be single words (i.e., cat/frog/dog or black/red/blue). However, it should be appreciated that variation-phrases may comprise a plurality of words, phrases, and/or numbers. Accordingly, reference to variation-phrases as being a single "term" should be viewed as illustrative, and not as limiting upon the disclosed subject matter.

Figure 9:
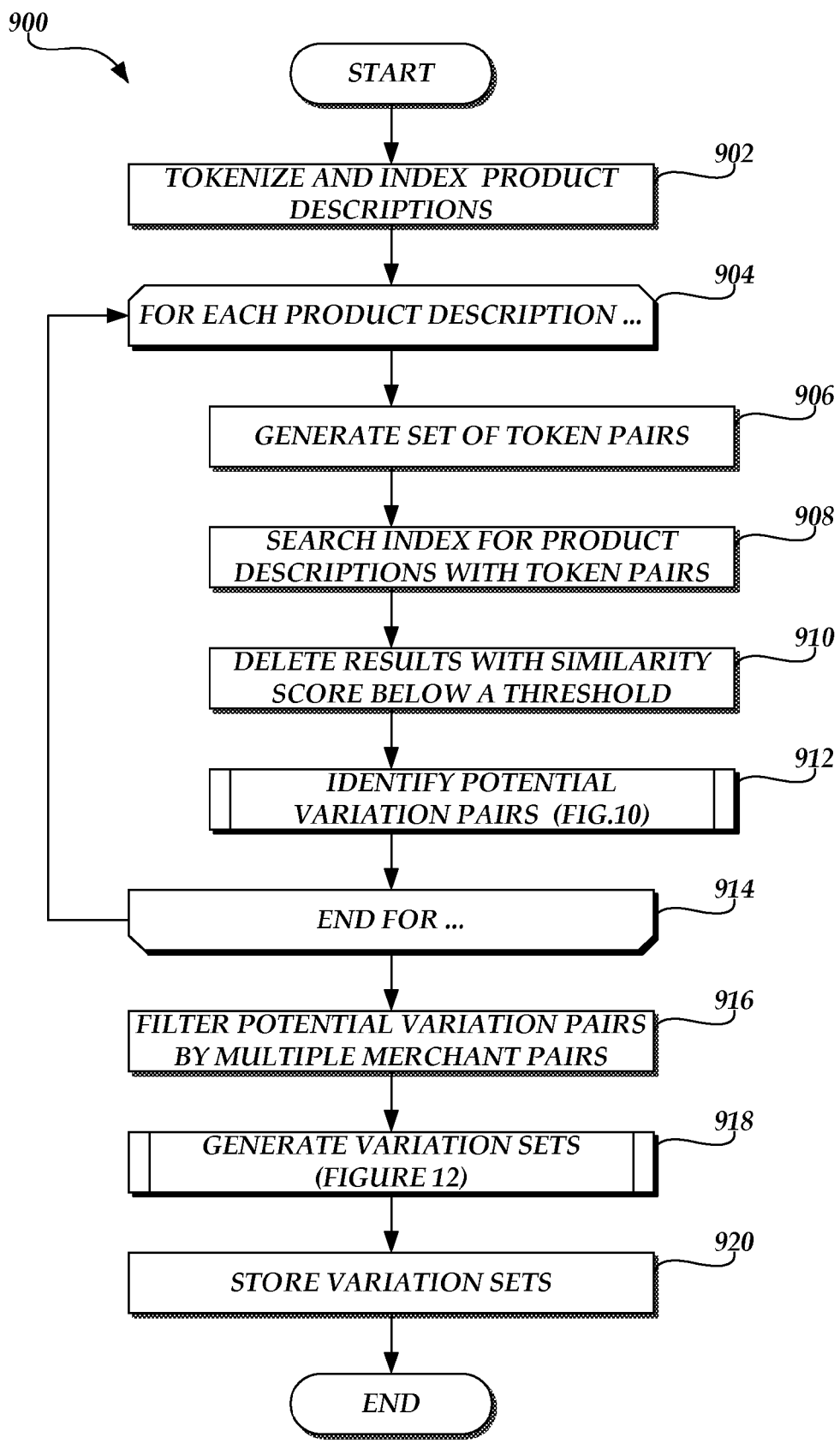
FIG. 9 is a flow diagram of an illustrative routine for identifying variation-phrase sets among product descriptions in a document corpus such that they may be used in determining whether two documents are duplicates of each other.

Turning now to FIG. 9, this figure shows a flow diagram of an illustrative routine 900 for identifying variation-phrase sets among product descriptions in a document corpus such that they may be used in determining whether two documents are duplicates of each other (i.e., describe substantially the same subject matter). Of course, while the following discussion is made in regard to product descriptions and in detecting duplicates, it should be appreciated that the concepts disclosed in this and subsequent routines may be suitably applied to locating variation-phrase sets among a single or multiple documents, irrespective of whether or not they describe products or items for sale. Accordingly, the description with regard to product descriptions should be viewed as illustrative and not as limiting.

Beginning at block 902, for searching purposes and if not already completed, the product descriptions/documents in the document corpus 310 are tokenized and indexed, as described above. Of course, while indexing the product descriptions will likely provide a substantial increase in search performance, indexing the document corpus 310 is not necessary for identifying variation-phrase sets such that block 902 should be viewed as optional.

At control block 904, a looping construct (a "for" loop) is begun to iterate through the product descriptions in the document corpus 310 in order to identify the variation-phrase sets in the document corpus. This looping construct repeats the steps of 906-912, those between control block 904 and end control block 914, for all of the product descriptions. Only when all product descriptions in the document corpus 310 have been processed does the routine 900 proceed to block 916.

At block 906, a set of token pairs, or bigrams, for the product description is generated. A "shingle" technique is used to generate the bigrams. This shingle technique generates a token pair for each adjacent token in the product description/document. For example, assuming that the currently selected product description was description 802 (FIG. 8), the set of token pairs would comprise the following four pairs/bigrams: {Folkmani's/Mini, Mini/Frog, Frog/Finger, and Finger/Puppet}.

At block 908, the document corpus 310 (or the token index 312) is searched for the token pairs generated at block 906. Searching the document corpus 310 for documents with token pairs as generated in block 904 allows the routine 900 to focus on product descriptions that are likely to contain variation-phrases. Moreover, this search is vendor specific, i.e., the document corpus 310 is searched for product descriptions that include the token pairs for the currently selected product description and that originated from the same vendor as the currently selected product description. With regard to the token pairs, the search is conducted for product descriptions that include any of the token pairs in the set of tokens. The results of the search is a set of product descriptions that (a) were provided by or originated from the same vendor, and (b) include any of the token pairs (as token pairs, not as separate tokens) in the retrieved product descriptions.

At block 910, as an optional efficiency step, those product descriptions in the returned set of product descriptions that have low similarity to the current product description are removed. The evaluation as to whether a product description from the results set has a low similarity to the current product description may be based on the number of bigram pairs that are found to be common between the documents. Other similarity scores, including those described above, may be applied. Those product descriptions whose score falls below a given threshold are removed from the results set of product descriptions.

At block 912, potential variation-phrase pairs between the results set and the current product description are identified. Identifying potential variation-phrase pairs between the current product description and the remaining product descriptions in the results set is described in regard to FIG. 10.

Figure 10:
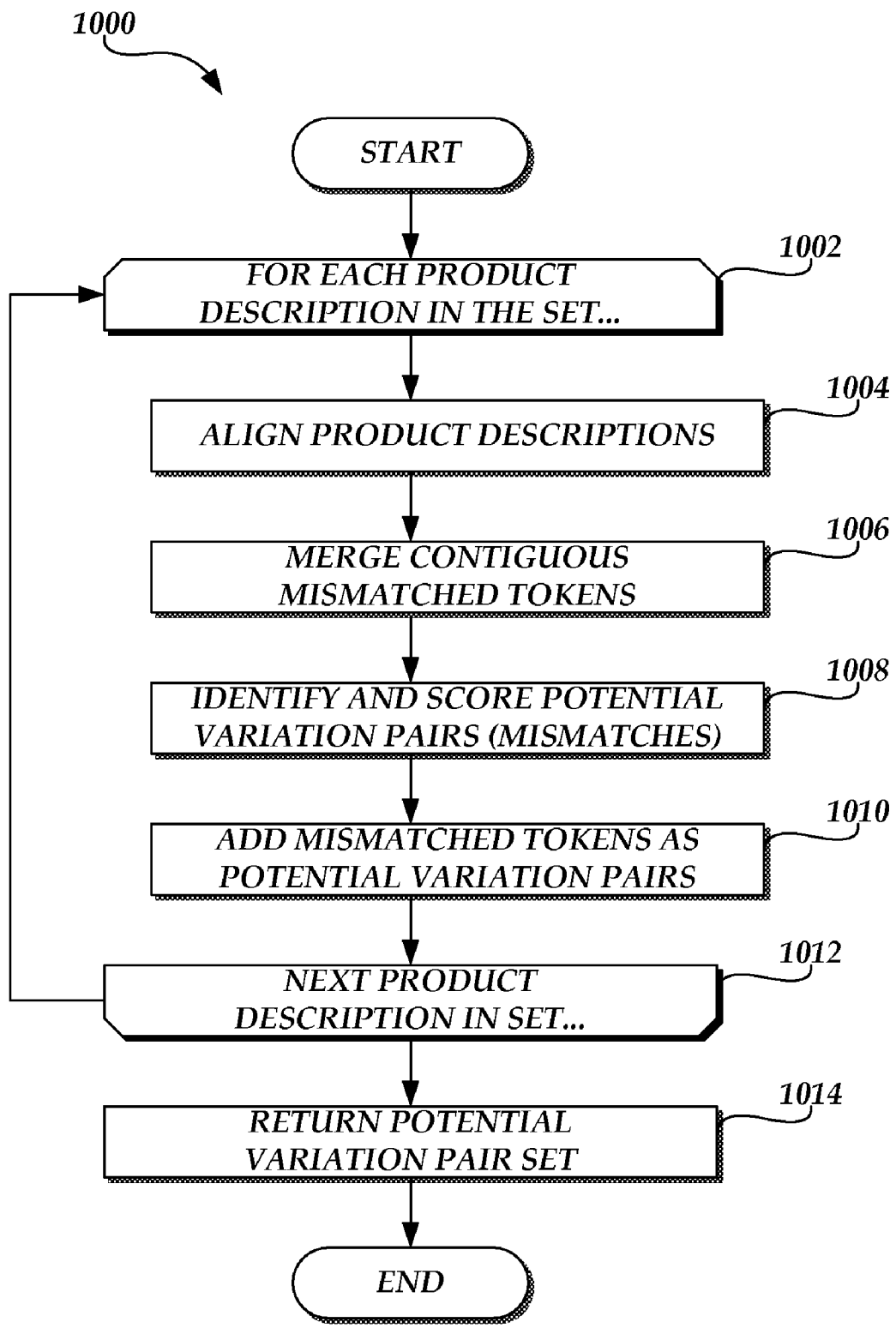
FIG. 10 is a flow diagram of an illustrative routine for generating potential variation-phrase pairs between a current product description and a set of product descriptions.

FIG. 10 is a flow diagram of an illustrative routine 1000 for generating potential variation-phrase pairs between a current product description and a set of product descriptions. Beginning at control block 1002, a looping construct is begun to iterate through each product description in the set of product descriptions to evaluate with regard to the current product description. This looping construct iterates the steps 1004-1010 until, at end control block 1012, there are no other product descriptions in the set to evaluate.

At block 1004, the current product description and the product description selected from the set are aligned. More particularly, aligning product descriptions aligning terms in the current product description with the product description selected from the set. In one embodiment, a modified Needleman-Wunsch text alignment algorithm is used to align the text of the product descriptions. The Needleman-Wunsch text alignment algorithm is a well known algorithm to align string sequences. Typically, the Needleman-Wunsch text alignment algorithm prefers a match by giving it a score of +1, giving a gap (i.e., a term not matched to anything, as opposed to a mismatch of terms) a score of 0, and giving a mismatch (being undesirable) a score of −1. FIG. 11A illustrates product descriptions 802 and 804 aligned according to the typical Needleman-Wunsch text alignment algorithm. As can be seen, using the typical algorithm, "gaps" are entered such that "frog" is set against a gap (as shown in box 1102) as well as "cat" (as shown in box 1104.) In contrast to the typical Needleman-Wunsch text alignment algorithm, the modified Needleman-Wunsch text alignment algorithm scores matches with a +1, mismatches with a 0, and gaps with a −1. This modification is made to emphasize the desire to identify mismatches which are potentially variation-phrases. The results of the modification to scoring the text alignment is illustrated in FIG. 11B where, in contrast to FIG. 11A, "frog" and "cat" are grouped together as a mismatch (as shown in box 1106).

After aligning the text of both product descriptions, at block 1006, contiguous mismatched tokens may merge together as a single token. Merging tokens recognizes that some variation-phrases are actually multiple words, rather than a single word. For example, with regard to FIG. 11C, the terms "Phoenix," "Suns," "Utah," and "Jazz" are aligned with gaps under the normal Needleman-Wunsch text alignment algorithm, as illustrated by boxes 1108 and 1110, whereas in FIG. 11D, these same terms are aligned as mismatches, as illustrated by box 1112, and also merged as a the single terms "Phoenix Suns" and "Utah Jazz". It should be appreciated that there does not need to be a balance of terms in mismatches, such that a single term in one product description could be mismatched to multiple terms in another product description.

After merging contiguous mismatches, at block 1008, the mismatches identified in the text alignment step of 1006 are located and scores for these mismatches are determined. A score for a mismatch is determined by looking before and after the mismatch: a point is given for contiguous matches on either side of the mismatch (and if the mismatch is on the beginning or end, a point is awarded). For example, the score for the mismatch 1106 in FIG. 11B is 4, two matched terms on either side of the mismatch, while the score for the mismatch 1112 of FIG. 11D is 3.

At block 1010, the identified mismatches (potential variation-phrase pairs) and corresponding scores are stored in the variation-phrase pair set for the current product description. Thereafter, at end control block 1012, the routine 1000 returns to block 1002, as described above, if there are additional product descriptions in the product description set, or at block 1014 returns the potential variation-phrase pair set generated for the current product description and the routine 1000 terminates.

Returning again to routine 900 of FIG. 9, after obtaining a list of variation-phrases for the current product description, at end control block 912, the routine 900 returns to control block 904 if there are additional product descriptions to evaluate. Otherwise, the routine 900 proceeds to block 916.

As indicated above, the product descriptions up to this point have been compared only with product descriptions from the same vendor. However, at block 916, the variation-phrase pairs are filtered against variation-phrase pairs of other merchants. In particular, a count is made with regard to the number of different merchants that have a particular variation-phrase pair, and remove those variation-phrase pairs whose count falls below a certain threshold. Intuitively, if a particular variation-phrase pair is present in submissions from several vendors, it is unlikely that the variation-phrase pair is a spurious pair, but rather a legitimate variation-phrase pair. Of course, the higher the threshold used to filter out potential variation-phrase pairs, the more likely that the remaining pairs will be truly variation-phrase pairs (though at the expense of the loss of legitimate variation-phrase pairs).

At block 918, variation-phrase sets are generated from the various potential variation-phrase previously identified. Generating variation-phrase sets from the various potential variation-phrases is set forth below in regard to FIG. 12. Actual variation-phrase sets are returned and at block 920 the variation-phrase sets are stored for subsequent use (such as determining whether a first document describes substantially similar subject matter to that described in one or more additional documents). Thereafter, the routine 900 terminates.

Figure 12:
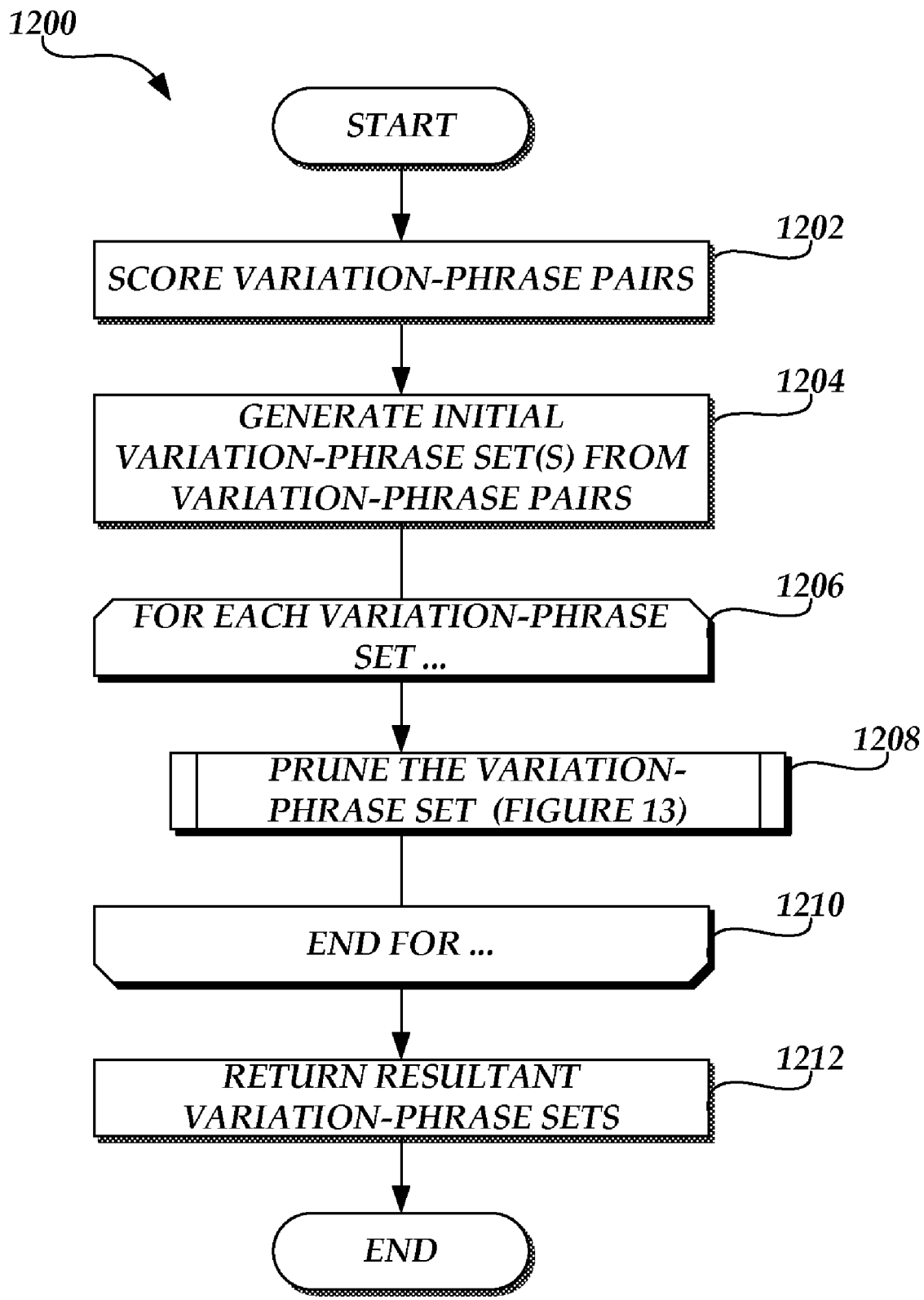
FIG. 12 is a flow diagram of an illustrative routine for determining variation-phrase sets from the potential variation-phrase sets identified in the routine 1000 of FIG. 10.

Turning now to FIG. 12, this figure shows a flow diagram of a routine 1200 for determining variation-phrase sets from the potential variation-phrases previously identified as described above. Stated differently, routine 1200 performs a filtering, or clustering process, on the identified potential variation-phrases in order to remove mismatched tokens/terms as opposed to actual variation-phrase pairs.

Beginning at block 1202, the potential variation-phrase pairs are scored. Scoring variation-phrase pairs typically comprises summing the scores (as discussed above) for variation-phrase pairs as they occur throughout a document corpus from all vendors. The scores for the variation-phrase pairs are used in pruning or clustering the variation-phrase sets in order to remove "noise", pairs that are deemed to be spurious and/or erroneous. At block 1204, an initial set of variation-phrase pairs is generated, that includes all of the potential variation-phrase pairs identified.

At control block 1206, the routine 1200 iteratively steps through each variation-phrase set initially generated since, quite often if not typically, more than one variation-phrase set will have been generated. This looping structure (begun at control block 1206 and ending at end control block 1210) iterates through each variation-phrase set generated. More particularly, in iterating, at block 1208, each variation-phrase set is pruned to eliminate spurious elements from the set. Pruning a variation-phrase set is described below in greater detail in regard to FIG. 13. The result of this pruning is one or more variation-phrase sets, which are collected and returned, at block 1212, after having pruned all of the clusters in the initial variation-phrase set or sets. After returning the variations-phrase sets, the routine 1200 terminates.

Figure 13:
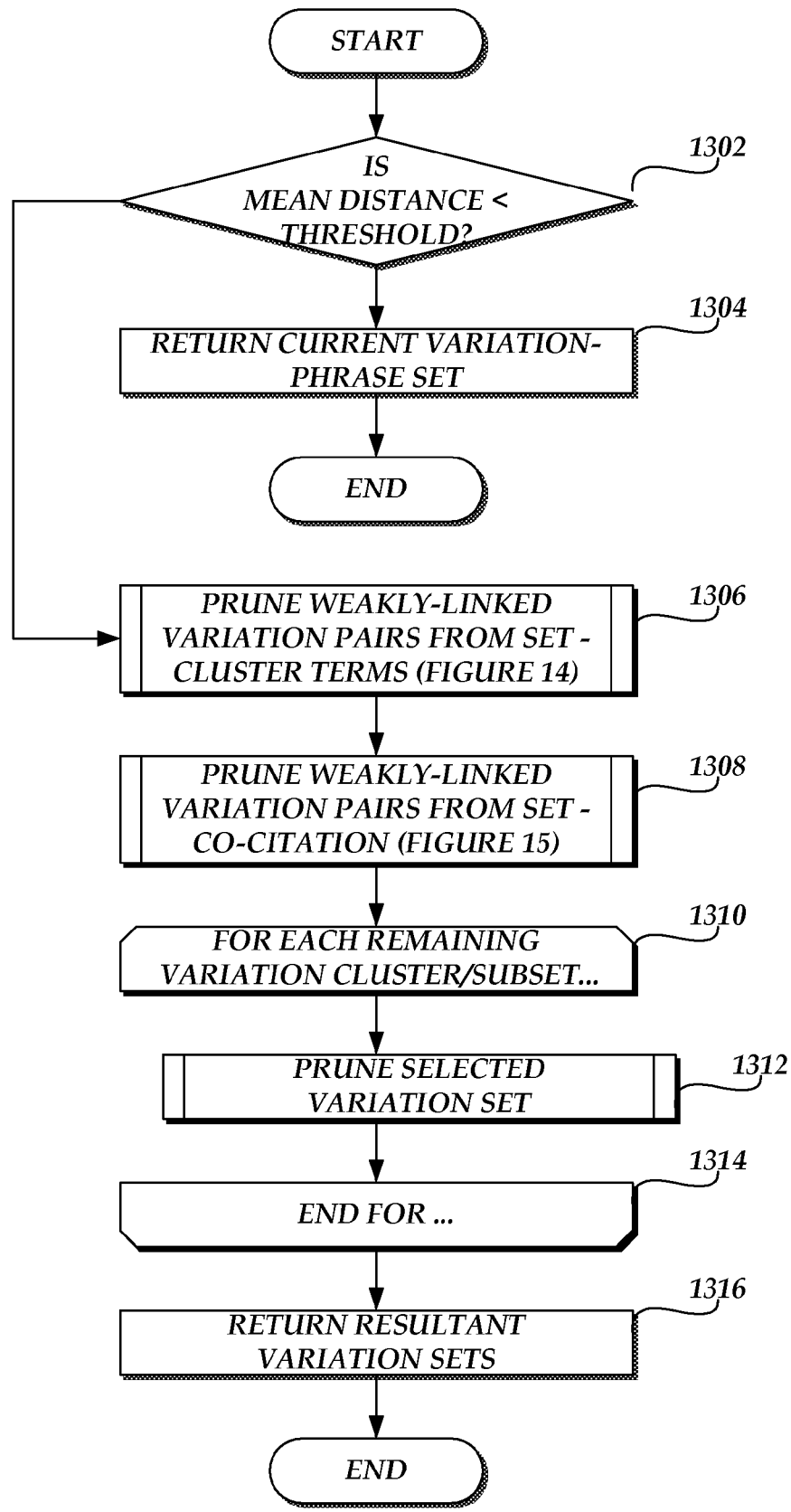
FIG. 13 and is a flow diagram of an illustrative routine for pruning a variation-phrase set.

FIG. 13 is a flow diagram of an illustrative routine 1300 for pruning a cluster, i.e., a variation-phrase set. As mentioned above, the initial variation-phrase set (as set forth in regard to routine 1200 of FIG. 12) can be broken down (through the processes described below) into variation-phrase sets where the variation-phrases are strongly linked. In particular, routine 1300 is set forth as a recursive routine that recursively processes a variation-phrase set until specific criteria are met. When the criteria are met, it is assumed that one of potentially many variation-phrase sets is properly defined and the recursion stops on that particular set (though it may continue for other variation-phrase sets). However, while the present routine 1300 is presented as a recursive routine that repeatedly breaks down a given variation-phrase set into smaller sets until certain conditions are met, those skilled in the art will appreciate that a recursive routine may be similarly implemented as an iterative, non-recursive routine. Accordingly, the precise nature of the routine is set forth as illustrative only, and should not be construed as limiting upon the disclosed subject matter.

Beginning at decision block 1302, a determination is made as to whether the criteria for terminating the recursive cycle should be terminated. In one embodiment, at decision block 1302, a determination is made as to whether the mean distance between variation-phrases in the variation-phrase set falls below a particular threshold. With regard to "distance," this refers to the minimum number of variation-phrases it takes to traverse from a first variation-phrase to a second variation-phrase in the variation-phrase set. For example, given the variation-phrase set {dog/frog, dog/turtle, dog/bear, frog/turtle, turtle/bear, bear/rabbit, rabbit/fox, dog/black, dog/silver, dog/brown, and dog/gray}, the minimum distance from dog to fox is 3, i.e., from dog to bear (1), from bear to rabbit (2), and rabbit to fox (3). The mean distance is the total minimum distance of all permutations of variation-phrases in the variation-phrase set, divided by the number of variation-phrase pairs in the set.

If the mean distance of the current variation-phrase set is less than a given threshold, such as (by way of example only) four, then the criteria for sufficiently defining a variation-phrase set is met and the routine 1300 returns the variation-phrase set as one of the resultant variation-phrase sets to be used and/or stored for later use.

However, if the mean distance does not fall below the threshold, the routine 1300 proceeds to block 1306.

Weakly linked variation-phrase pairs in the current variation-phrase set are pruned, as indicated by box 1305. In one embodiment, pruning is accomplished by way of clustering the variation-phrase pairs (and deleting those pairs in the lowest cluster) and by way of co-citation Jaccard scoring (and deleting low scoring pairs). More particularly, at block 1306, weakly linked variation-phrase pairs are pruned/deleted from the set using a cluster terms algorithm, as described in FIGS. 14A and 14B.

Figure 14A:
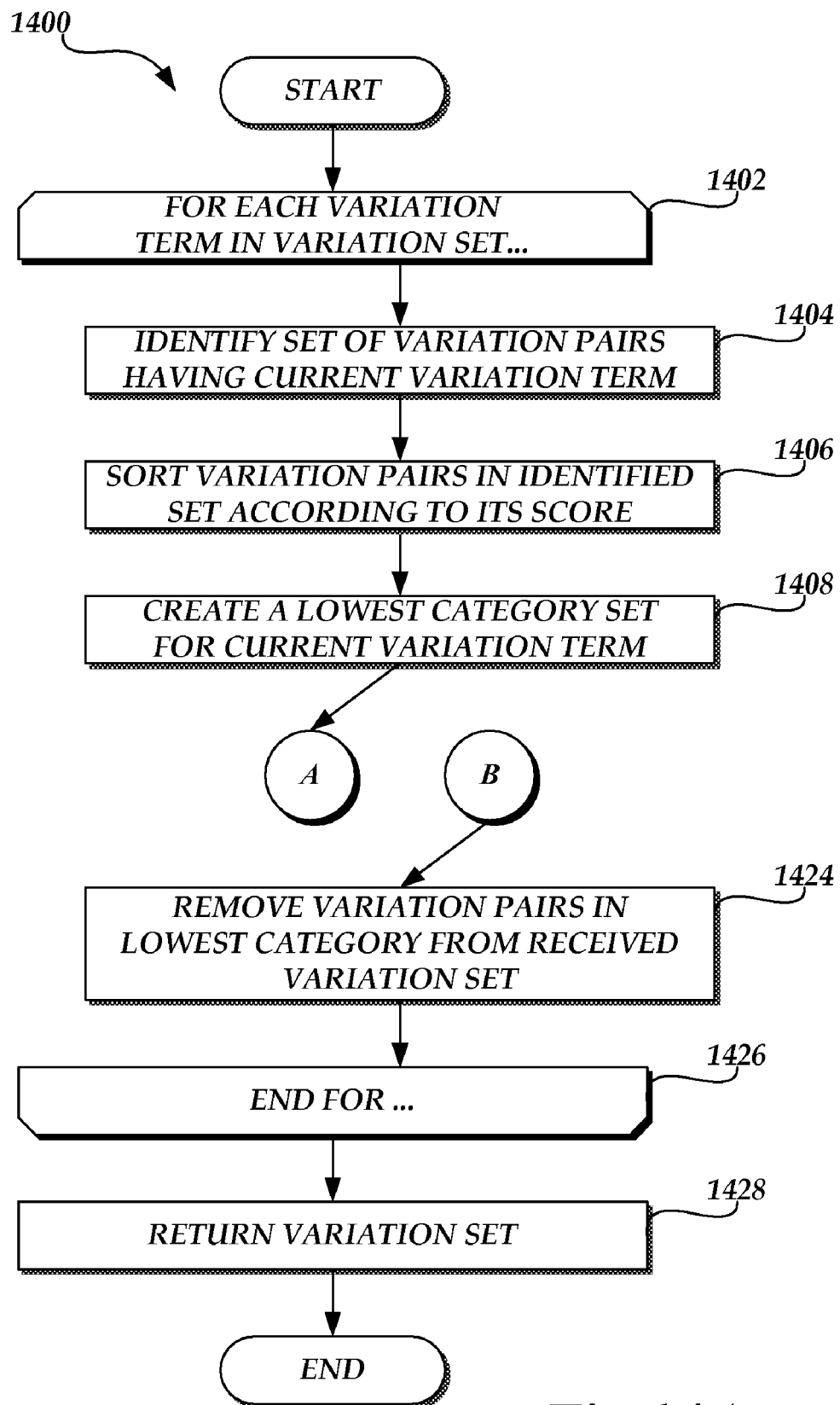
FIGS. 14A and 14B show a flow diagram of an illustrative routine for pruning weakly linked variation-phrase pairs from a variation-phrase set using a cluster terms algorithm.
Figure 14B:
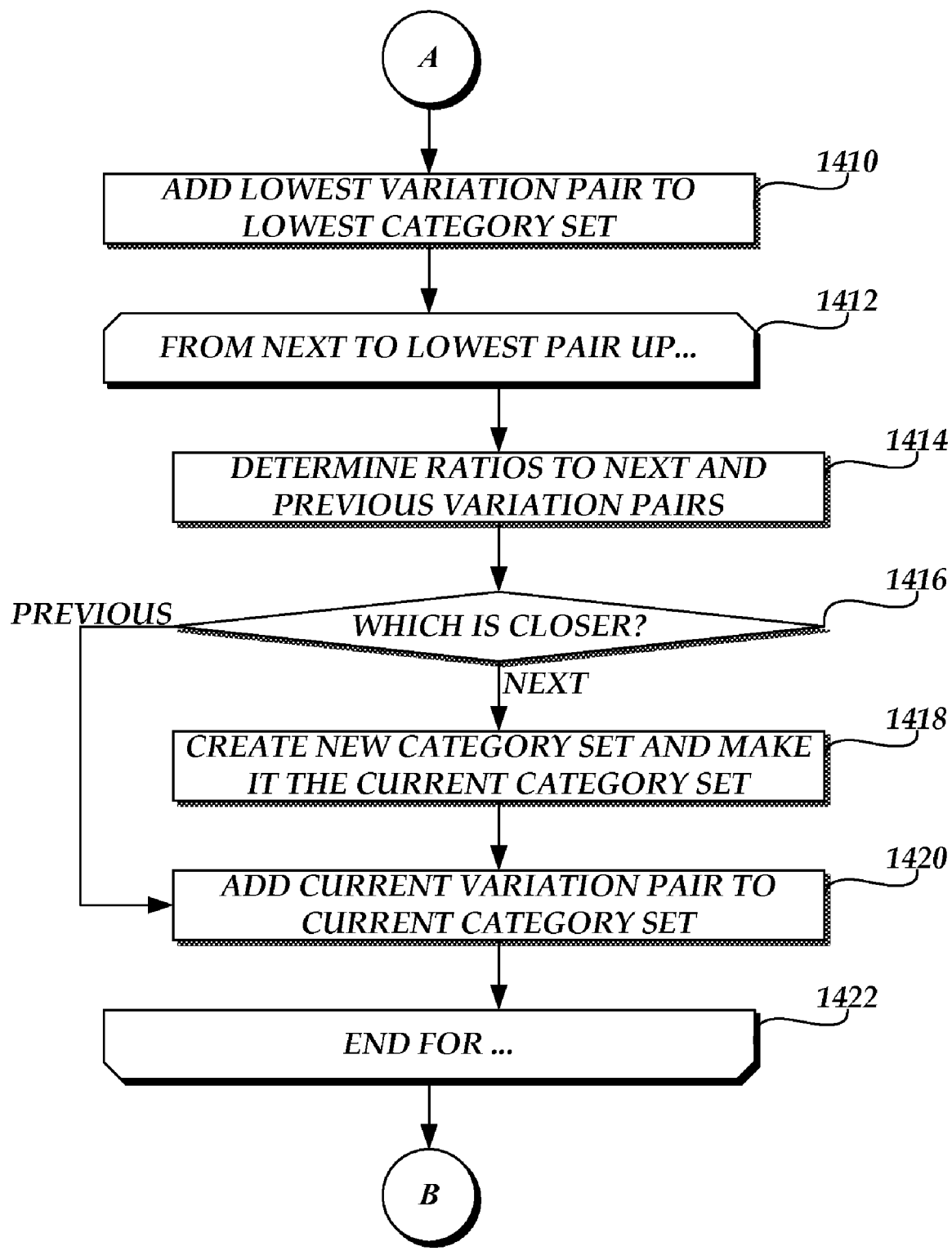

FIGS. 14A and 14B illustrate an exemplary routine 1400 for pruning weakly linked variation-phrase pairs from the variation-phrase set using a cluster terms algorithm. Beginning with control block 1402, this control block along with matching end control block 1424 iterates through each variation-phrase in the variation-phrase set as described in steps 1404-1422.

At block 1404, a set of variation-phrase pairs that include the current variation-phrase is identified. Referring to the example above, and assuming the current variation-phrase is "dog", the set of variation-phrase pairs with this term is {dog/frog, dog/turtle, dog/bear, dog/black, dog/silver, dog/brown, and dog/gray}. This set of variation-phrase pairs is then sorted according to the scores determined above (at block 1202 of FIG. 12). For example, assume that the scores for the variation-phrase pairs are as follows:

| | |
|---|---:|
| dog/bear | 509507 |
| dog/brown | 819 |
| dog/turtle | 71955 |
| dog/frog | 96454 |
| dog/silver | 888 |
| dog/black | 23638 |
| dog/gray | 783. |

At block 1406, the variation-phrase pairs containing the current variation-phrase are sorted. Continuing the above example, this yields the following ordering:

| | |
|---|---:|
| dog/bear | 509507 |
| dog/frog | 96454 |
| dog/turtle | 71955 |
| dog/black | 23638 |
| dog/silver | 888 |

-continued

| | |
|---|---|
| dog/brown | 819 |
| dog/gray | 783. |

At block 1408, a lowest category set or "bucket" is created to hold variation-phrase pairs. After creating the first, lowest category set, which at the beginning is the current category set, at block 1410 (FIG. 14B), the lowest scoring pair is added to the lowest category set. At control block 1412, an iteration (from second lowest to the highest scoring variation-phrase pair) is begun. At block 1414, using the current variation-phrase pair, a next and previous ratio with regard to the current variation-phrase pair is determined. This ratio is based on the scores of the variation-phrases. For example, with regard to the second lowest variation-phrase pair, "dog/brown", the next ratio for this variation-phrase pair is 888/819 or 1.0842, and the previous ratio is 819/783 or 1.046.

At decision block 1416, a determination as to which ratio is less is made. If the "next" ratio is smaller, the routine 1400 proceeds to block 1418 where a new category set is created and becomes the current category set. At block 1420, after creating the new category set or if the "previous" ratio was less, the current variation-phrase pair (in this example, "dog/brown") is added to the current category set. At end control block 1422, the routine 1400 returns to control block 1412 if there are more variation-phrase pairs to categorize, or continues to block 1424 otherwise. Continuing the example of above, after iterating though the variation-phrase pairs, there will be four category sets containing the following variation-phrase pairs:
- dog/bear;
- dog/frog, dog/turtle;
- dog/black; and
- dog/silver, dog/brown, dog/gray.

At block 1424, the variation-phrase pairs in the lowest category set are pruned/removed from the variation-phrase set passed to the routine 1400. At end control block 1426, the process described above is repeated for the other variation-phrases in the variation-phrase set. Once all variation-phrases have been processed, at block 1428 the resulting variation-phrase set is returned, and the routine 1400 terminates.

Returning again to routine 1300 of FIG. 13, as another part of pruning spurious terms from the variation-phrase set, at block 1308, weakly linked variation-phrases are pruned according to a co-citation Jaccard algorithm, as described below in FIG. 15.

Figure 15:
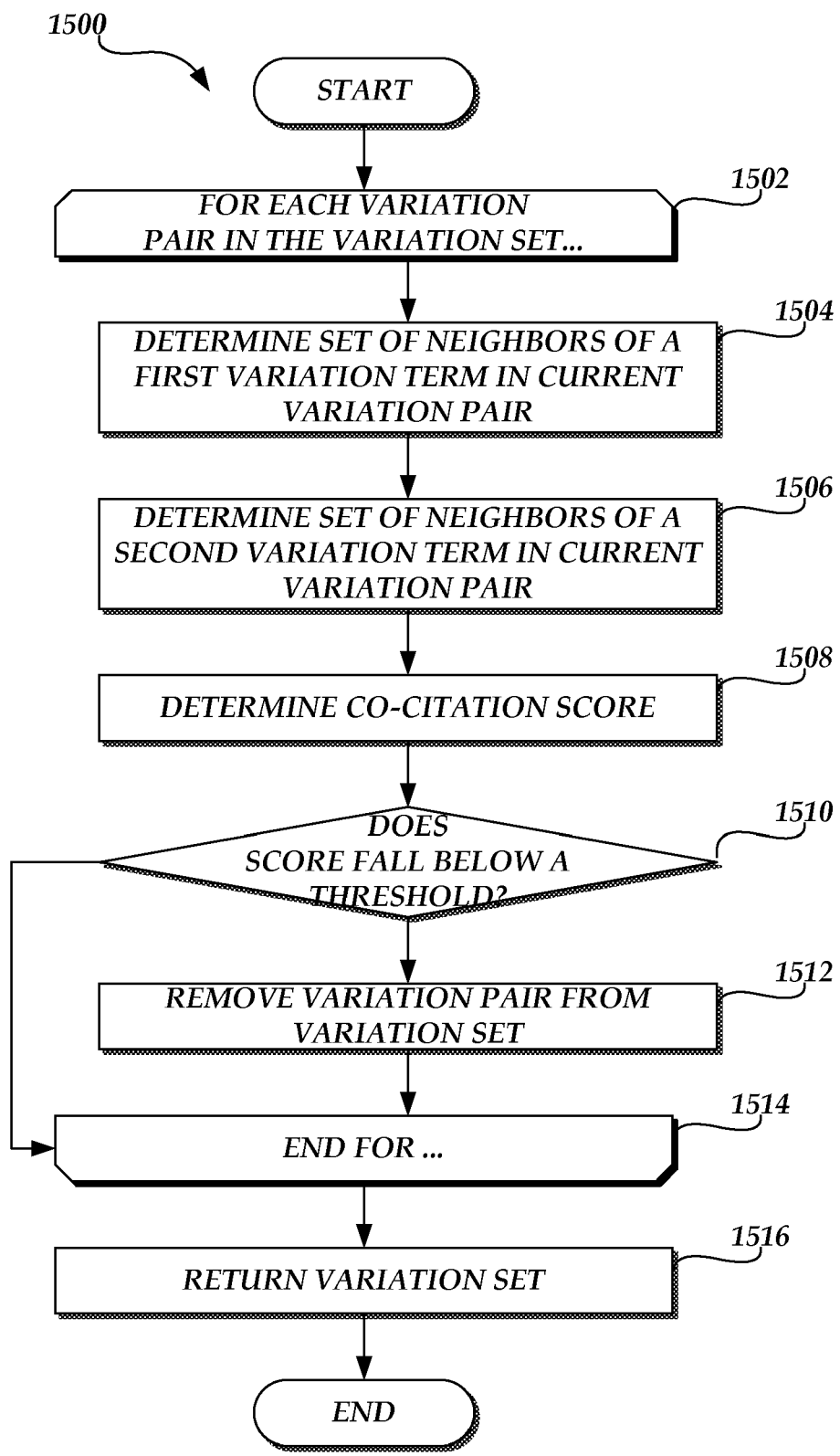
FIG. 15 is a flow diagram illustrating an exemplary routine for pruning weakly linked variation-phrase pairs (presumably spurious pairs) from a variation-phrase set.

FIG. 15 is a flow diagram illustrating an exemplary routine 1500 for pruning weakly linked variation-phrase pairs (presumably spurious pairs) from a variation-phrase set. Beginning at control block 1502, a looping construct is begun to iterate through each variation-phrase pair in the variation-phrase set upon which this routine is to operate.

At block 1504, the set of "neighbors" of the first variation-phrase of the current variation-phrase pair is determined. Neighbors for a first variation-phrase is defined as variation-phrases (aside from the second term of the current variation-phrase pair) to which the first variation-phrase is paired. For example, with reference to the initial variation-phrase set above, if the current variation-phrase pair is "dog/bear" and the first variation-phrase is "dog," the set of neighbors for "dog" is {frog, turtle, black, silver, brown, and gray}.

At block 1506, the set of neighbors of the second variation-phrase of the current variation-phrase pair is determined. From the example above, the set of neighbors for "bear" is {turtle, and rabbit}.

With the neighbors determined for each of the variation-phrases, at block 1508 a co-citation Jaccard score is determined. In one embodiment, the co-citation score is determined according to the formula:

$$\frac{N(\text{term1}) \cap N(\text{term2})}{N(\text{term1}) \cup N(\text{term2})}$$

where "N(term)" corresponds to the neighbors of the variation-phrase, "term1" corresponds to a first variation-phrase of the variation-phrase pair, and "term2" corresponds to a second variation-phrase of the variation-phrase pair.

At decision block 1510, a determination is made as to whether the resulting score falls below a particular threshold. If the score falls below a predetermined threshold, at block 1512 the variation-phrase pair is removed from the variation-phrase set. Otherwise, or if the score does not fall below the predetermined threshold, at end control block 1514 the routine 1500 returns to control block 1502 to continue iterating through the variation-phrase pairs in the variation-phrase set if there are additional variation-phrase pairs. When all variation-phrase pairs have been processed, at block 1516 the variation-phrase set (which may include several distinct subsets) is returned and the routine 1500 terminates.

Returning again to routine 1300 of FIG. 13, after having pruned the weakly linked variation-phrase pairs from the variation-phrase set (which may result in multiple discrete subsets of variation-phrase pairs), at control block 1310 a for loop is begun to iterate through each of the discrete variation subsets in the variation-phrase sets. Accordingly, at block 1312, the routine 1300 is recursively called to prune the weakly linked variation-phrase pairs (presumably spurious pairs) of the currently selected discrete variation subset. At end control block 1314, control of the for loop returns to block 1310 if there are additional discrete subsets in the variation-phrase set. If there are not more discrete variation subsets to process, at block 1316 the resultant variation-phrase sets are returned and the routine 1300 terminates.

While not shown in FIG. 13, one aspect of recursively pruning weakly linked variation-phrase pairs from a variation-phrase set may be to modify a threshold for determining whether to prune a particular variation-phrase pair. For example, as variation-phrase sets are recursively pruned, the threshold used in determination block 1510 may continually be increased (or decreased) to achieve desired pruning effects.

While illustrative embodiments have been illustrated and described, it will be appreciated that various changes can be made therein without departing from the spirit and scope of the invention.

The embodiments of the invention in which an exclusive property or privilege is claimed are defined as follows:

1. A computer system for determining a set of variation-phrases from a collection of documents, the system comprising:
   a processor; and
   a memory storing instructions, wherein the said instructions are executable by the processor to:
      access a document corpus comprising a plurality of documents;
      for each document in the document corpus:
         identify a set of similar documents from the document corpus having at least some tokens in common;
         align the text of the documents of the identified set of similar documents to compare and identify potential variation-phrase pairs, each identified potential variation-phrase pair comprising two phrases from said identified set that are non-synonymous descriptions of a common item type offered for sale;
  wherein aligning the text of the documents of the identified set of similar documents to identify potential variation-phrase pairs comprises:
    aligning the text of a first document from said set of similar documents with the text of a second document from said set of similar documents; and
    identifying non-matching tokens that resulted from aligning the first and second documents from said set of similar documents as potential variation-phrase pairs; and
    add the identified potential variation-phrase pairs to a variation-phrase set, at least some of the phrases in the variation-phrase set being non-synonymous with the other phrases in that set;
  filter the potential variation-phrase pairs to remove from the variation-phrase set potential variation-phrase pairs that do not satisfy one or more predetermined criteria; and
  store the resulting variation-phrase set in a data store.

2. The computer system of claim 1, wherein identifying a set of similar documents form the document corpus comprises:
  generating a set of bigrams for a first selected document; and
  identifying a set of documents from the document corpus that include at least one of the bigrams of the set of bigrams.

3. The computer system of claim 2, wherein aligning the text of the first document with the text of the second document maximizes the alignment of matching tokens of the two documents without modifying the arrangement of the documents.

4. The computer system of claim 1, wherein the documents are aligned according to a modified Needleman-Wunsch text alignment algorithm that favors aligning non-matching tokens over gaps.

5. The computer system of claim 1, wherein aligning the text of the documents of the identified set of similar documents to identify potential variation-phrase pairs comprises determining an individual score for each potential variation-phrase pair according to the alignment of the first and second documents from which each potential variation-phrase pair was derived.

6. The computer system of claim 5, wherein the computer system is further configured to generate a cumulative score for each of the potential variation-phrase pairs in the variation-phrase set according to the individual scores of each potential variation-phrase pair from each first and second document in the document corpus having the potential variation-phrase pair.

7. The computer system of claim 1, wherein the computer system is further configured to generate a cumulative score for each of the potential variation-phrase pairs in the variation-phrase set.

8. The computer system of claim 7, wherein filtering comprises pruning weakly linked potential variation-phrase pairs from the variation-phrase set, wherein said pruning comprises:
  for each discrete subset of potential variation-phrase pairs in the variation-phrase set:
    determining whether the current discrete subset of potential variation—phrase pairs satisfies a predetermined pruning criteria; and
    if the current discrete subset of potential variation-phrase pairs fails to satisfy the predetermined pruning criteria, pruning weakly linked potential variation-phrase pairs from the discrete subset of potential variation-phrase pairs.

9. The computer system of claim 8, determining whether the current discrete subset of potential variation-phrase pairs satisfies a predetermined pruning criteria comprises determining whether the mean distance between variation-phrases in the current discrete subset of potential variation-phrase pairs falls below a distance threshold.

10. The computer system of claim 8, wherein pruning weakly linked potential variation-phrase pairs from the variation-phrase set is performed recursively on each discrete subsets of potential variation-phrase pairs in the variation-phrase set.

11. The computer system of claim 8, wherein pruning weakly linked potential variation-phrase pairs from the discrete subset of potential variation-phrase pairs comprises:
  sorting the potential variation-phrase pairs according to their cumulative score;
  clustering the potential variation-phrase pairs into at least one cluster set according to the cumulative scores; and
  deleting those potential variation-phrase pairs that fall into the cluster set corresponding to the cluster of potential variation-phrase pairs with the lowest cumulative scores.

12. The computer system of claim 11, wherein clustering the potential variation-phrase pairs into at least one cluster set according to the cumulative scores comprises:
  placing the potential variation-phrase pair from the discrete variation-phrase set with the lowest cumulative score in a lowest cluster set;
  for each of the remaining potential variation-phrase pairs in the discrete variation-phrase set, beginning with the potential variation-phrase pair with the lowest cumulative score to the highest:
    determine a next and previous ratio score for the current potential variation-phrase pair according to the scores of the next and previous potential variation-phrase pairs;
    if the previous ratio score is smaller than the next ratio score, place the current potential variation-phrase pair in the same cluster set as the previous potential variation-phrase pair; and
    if the next ratio score is smaller than the previous ratio score, create a new cluster set and place the current potential variation-phrase pair in the newly created cluster set.

13. The computer system of claim 8, wherein pruning weakly linked potential variation-phrase pairs from the discrete subset of potential variation-phrase pairs further comprises:
  for each variation-phrase pair in the discrete subset of potential variation-phrase pairs:
    determining a co-citation score for the current variation-phrase pair with regard to other variation-phrase pairs in the discrete subset of potential variation-phrase pairs; and
    pruning the potential variation-phrase pair from the discrete subset of potential variation-phrase pairs if the co-citation score falls below a co-citation threshold.

14. The computer system of claim 13, wherein determining a co-citation score for the current variation-phrase with regard to other variation-phrases in the discrete subset of potential variation-phrase pairs comprises determining the co-citation score according to the co-citation Jaccard formula $$\frac{N(\text{term1}) \cap N(\text{term2})}{N(\text{term1}) \cup N(\text{term2})}$$

where "N(term)" corresponds to the neighbors of the potential variation-phrase, "term1" corresponds to a first variation-phrase of the variation-phrase pair, and "term2" corresponds to a second variation-phrase of the variation-phrase pair.

15. A computer system for determining a set of variation-phrases from a collection of documents, the system comprising:
a processor; and
a memory storing instructions, wherein the instructions are executable by the processor to:
access a document corpus comprising a plurality of documents;
identify potential variation-phrase pairs among the various documents in the document corpus, each identified potential variation-phrase pair comprising two phrases from said document corpus that are non-synonymous descriptions of a common item type offered for sale;
wherein identifying potential variation-phrase pairs comprises aligning the text of the documents of the document corpus to compare and identify potential variation-phrase pairs,
wherein each identified potential variation-phrase pair comprising two phrases from said document corpus that are non-synonymous descriptions of a common item type offered for sale,
wherein aligning the text of the documents of the document corpus to identify potential variation-phrase pairs comprises;
aligning the text of a first document from said document corpus with the text of a second document from said document corpus; and
identifying non-matching tokens that resulted from aligning the first and second documents from said document corpus as potential variation-phrase pairs;
add the identified potential variation-phrase pairs to a variation-phrase set, at least some of the phrases in the variation-phrase set being non-synonymous with the other phrases in that set;
filter the potential variation-phrase pairs to remove those potential variation-phrase pairs that do not satisfy a predetermined criteria; and
store the resulting variation-phrase set in a data store.

16. The computer system of claim 15, wherein filtering the potential variation-phrase pairs to remove those potential variation-phrase pairs that do not satisfy a predetermined criteria comprises, for each discrete subset of potential variation-phrase pairs in the variation-phrase set, recursively pruning potential variation-phrase pairs from the current discrete subset of potential variation-phrase pairs until a predetermined pruning criteria is satisfied.

17. The computer system of claim 16, wherein pruning potential variation-phrase pairs from the current discrete subset of potential variation-phrase pairs comprises:
for each potential variation-phrase pair in the current discrete subset:
clustering the potential variation-phrase pairs into at least one cluster set according to cumulative scores corresponding to each potential variation-phrase pair, and deleting those potential variation-phrase pairs from the current discrete subset of potential variation-phrase pairs that fall into the cluster set corresponding to the cluster of potential variation-phrase pairs with the lowest cumulative scores; and
determining a co-citation score for each variation-phrase pair with regard to other variation-phrase pairs in the discrete subset of potential variation-phrase pairs, and pruning each potential variation-phrase pair from the discrete subset of potential variation-phrase pairs where the co-citation score falls below a co-citation threshold.

18. The computer system of claim 17, wherein clustering the potential variation-phrase pairs into at least one cluster set according to cumulative scores corresponding to each potential variation-phrase pair comprises:
placing the potential variation-phrase pair from the discrete variation-phrase set with the lowest cumulative score in a lowest cluster set;
for each of the remaining potential variation-phrase pairs in the discrete variation-phrase set, beginning with the remaining potential variation-phrase pair with the lowest cumulative score to the highest:
determine a next and previous ratio score for the current potential variation-phrase pair according to the cumulative scores of the next and previous potential variation-phrase pairs;
if the previous ratio score is smaller than the next ratio score, place the current potential variation-phrase pair in the same cluster set as the previous potential variation-phrase pair; and
if the next ratio score is smaller than the previous ratio score, create a new cluster set and place the current potential variation-phrase pair in the newly created cluster set.

19. The computer system of claim 17, wherein determining a co-citation score for each variation-phrase pair with regard to other variation-phrase pairs in the discrete subset of potential variation-phrase pairs comprises: determining the co-citation score according to the co-citation Jaccard formula $$\frac{N(\text{term1}) \cap N(\text{term2})}{N(\text{term1}) \cup N(\text{term2})}$$

where "N(term)" corresponds to the neighbors of the potential variation-phrase, "term1" corresponds to a first variation-phrase of the variation-phrase pair, and "term2" corresponds to a second variation-phrase of the variation-phrase pair.

20. An electronic market place offering items for sale from a plurality of vendors to consumers over a communication network, the electronic market place being motivated to identify sets of mutually exclusive variation-phrases regarding the items for sale, the electronic market place comprising:
a host server communicatively coupled to the computer network for presenting an electronic market place to and interacting with consumers over the communication network; and
a document corpus comprising a plurality of product descriptions from at least some of the plurality of vendors describing the items for sale via the electronic market place, wherein the document corpus is accessible to the host server;

wherein the host server is configured to:
identify potential variation-phrase pairs among the various product descriptions in the document corpus, each identified potential variation-phrase pair comprising two phrases from said document corpus that are non-synonymous descriptions of a common item type offered for sale,
wherein identifying potential variation-phrase pairs comprises aligning the text of the documents of the document corpus to compare and identify potential variation-phrase pairs,
each identified potential variation-phrase pair comprising two phrases from said document corpus that are non-synonymous descriptions of a common item type offered for sale,
wherein aligning the text of the documents of the document corpus to identify potential variation-phrase pairs comprises:
aligning the text of a first document from said document corpus with the text of a second document from said document corpus; and
identifying non-matching tokens that resulted from aligning the first and second documents from said document corpus as potential variation-phrase pairs;
add the identified potential variation-phrase pairs to a variation-phrase set, at least some of the phrases in the variation-phrase set being non-synonymous with the other phrases in that set;
filter the potential variation-phrase pairs to remove those potential variation-phrase pairs that do not satisfy a predetermined criteria; and
store the resulting variation-phrase set in a data store.

21. A computer-implemented method for generating a set of variation-phrases from a plurality of documents in a document corpus, the method comprising:
for each document in the document corpus:
identifying a set of similar documents from the document corpus having at least some tokens in common;
aligning the text of the documents of the identified set of similar documents to compare and identify potential variation-phrase pairs, each identified potential variation-phrase pair comprising two phrases from said identified set that are non-synonymous descriptions of a common item type offered for sale;
wherein aligning the text of the documents of the identified set of similar documents to identify potential variation-phrase pairs comprises:
aligning the text of a first document from said set of similar documents with the text of a second document from said set of similar documents; and
identifying non-matching tokens that resulted from aligning the first and second documents from said set of similar documents as potential variation-phrase pairs; and
adding the identified potential variation-phrase pairs to a variation-phrase set, at least some of the phrases in the variation-phrase set being non-synonymous with the other phrases in that set;
filtering the potential variation-phrase pairs to remove from the variation-phrase set potential variation-phrase pairs that do not satisfy predetermined criteria; and
storing the resulting variation-phrase set in a data store.

22. The method of claim 21, wherein said filtering comprises pruning weakly linked potential variation-phrase pairs from the variation-phrase set, wherein said pruning comprises:
for each discrete subset of potential variation-phrase pairs in the variation-phrase set, recursively pruning weakly linked potential variation-phrase pairs from the current discrete subset of potential variation-phrase pairs until a predetermined pruning criteria is satisfied;
and wherein pruning weakly linked potential variation-phrase pairs from the current discrete subset of potential variation-phrase pairs until a predetermined pruning criteria is satisfied comprises, for each potential variation-phrase pair in the current discrete subset:
clustering the potential variation-phrase pairs in the current discrete subset into at least one cluster set according to cumulative scores corresponding to each potential variation-phrase pair, and deleting potential variation-phrase pairs from the current discrete subset of potential variation-phrase pairs that fall into the cluster set corresponding to the cluster of potential variation-phrase pairs with the lowest cumulative scores; and
determining a co-citation score for each variation-phrase pair in the current discrete subset with regard to other variation-phrase pairs in the discrete subset, and pruning each potential variation-phrase pair from the current discrete subset where the co-citation score falls below a co-citation threshold.

23. The method of claim 22, wherein clustering the potential variation-phrase pairs in the current discrete subset into at least one cluster set according to cumulative scores corresponding to each potential variation-phrase pair comprises:
placing the potential variation-phrase pair from the current discrete subset with the lowest cumulative score in a lowest cluster set;
for each of the remaining potential variation-phrase pairs in the current discrete subset, beginning with the remaining potential variation-phrase pair with the lowest cumulative score to the highest:
determine a next and previous ratio score for the current potential variation-phrase pair according to the cumulative scores of the next and previous potential variation-phrase pairs;
if the previous ratio score is smaller than the next ratio score, place the current potential variation-phrase pair in the same cluster set as the previous potential variation-phrase pair; and
if the next ratio score is smaller than the previous ratio score, create a new cluster set and place the current potential variation-phrase pair in the newly created cluster set.

24. The method of claim 23, wherein determining a co-citation score for each variation-phrase pair with regard to other variation-phrase pairs in the discrete subset of potential variation-phrase pairs comprises: determining the co-citation score according to the co-citation Jaccard formula $$\frac{N(\text{term1}) \cap N(\text{term2})}{N(\text{term1}) \cup N(\text{term2})}$$

where "N(term)" corresponds to the neighbors of the potential variation-phrase, "term1" corresponds to a first variation-phrase of the variation-phrase pair, and "term2" corresponds to a second variation-phrase of the variation-phrase pair.

25. A tangible computer-readable medium bearing computer-executable instructions which, when executed on a computing device, carry out a method for generating a set of variation-phrases from a plurality of documents in a document corpus, the method comprising:

identifying potential variation-phrase pairs among at least some of the plurality of documents in the document corpus, wherein each identified potential variation-phrase pair comprising two phrases from said document corpus that are non-synonymous descriptions of a common item type offered for sale, wherein identifying potential variation-phrase pairs comprises aligning the text of the documents of the document corpus to compare and identify potential variation-phrase pairs, wherein each identified potential variation-phrase pair comprising two phrases from said document corpus that are non-synonymous descriptions of a common item type offered for sale, wherein aligning the text of the documents of the document corpus to identify potential variation-phrase pairs comprises:

aligning the text of a first document from said document corpus with the text of a second document from said document corpus; and identifying non-matching tokens that resulted from aligning the first and second documents from said document corpus as potential variation-phrase pairs;

adding the potential variation-phrase pairs to a variation-phrase set, at least some of the phrases in the variation-phrase set being non-synonymous with the other phrases in that set;

filter the potential variation-phrase pairs to remove those potential variation-phrase pairs that do not satisfy a predetermined criteria; and store the resulting variation-phrase set in a data store.

* * * * *